(12) United States Patent
Bleu-Laine et al.

(10) Patent No.: US 10,080,193 B1
(45) Date of Patent: Sep. 18, 2018

(54) POWER EFFICIENT WIRELESS CONNECTIVITY

(71) Applicant: Amazon Technologies, Inc., Seattle, WA (US)

(72) Inventors: Gilles-Arnaud Bleu-Laine, San Jose, CA (US); Eduardo Bezerra Valentin, Mountain View, CA (US); Aditya Yashwant Bhave, Santa Clara, CA (US); James David Meyers, San Jose, CA (US); Hanxiao Fu, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 15/079,713

(22) Filed: Mar. 24, 2016

(51) Int. Cl.
*H04L 29/08* (2006.01)
*H04W 52/02* (2009.01)

(52) U.S. Cl.
CPC ... *H04W 52/0235* (2013.01); *H04W 52/0212* (2013.01)

(58) Field of Classification Search
CPC ......... H04W 52/0212; H04W 52/0229; H04W 52/0235
See application file for complete search history.

(56) References Cited

U.S. PATENT DOCUMENTS

| 9,277,500 | B1* | 3/2016 | Solsona-Palomar | |
| | | | | H04W 52/0229 |
| 2013/0117586 | A1* | 5/2013 | Li | G06F 1/3209 |
| | | | | 713/310 |
| 2014/0173304 | A1* | 6/2014 | Rahman | H04L 12/6418 |
| | | | | 713/310 |
| 2014/0344604 | A1* | 11/2014 | Paljug | G06F 1/3209 |
| | | | | 713/323 |
| 2016/0218866 | A1* | 7/2016 | Patil | H04L 9/0833 |

\* cited by examiner

*Primary Examiner* — Charles C Jiang
*Assistant Examiner* — Ryan Kavleski
(74) *Attorney, Agent, or Firm* — Pierce Atwood LLP

(57) ABSTRACT

Described herein are systems and methods for maintaining a wireless connection to a remote server while a device is in a low power mode. As a result of maintaining the connection, the device can receive messages triggering a wakeup event and placing the device in a normal power mode, enabling the device to be controlled remotely. To maintain the connection, the device transitions from sending encrypted network messages to a server from a first interval while in the normal power mode to a second interval while in the low power mode. In addition, the device sends unencrypted network messages to the server at the first interval using low power circuitry. The low power circuitry receives messages from the server and may trigger the device to enter the normal power mode and/or a connection maintenance mode.

18 Claims, 17 Drawing Sheets

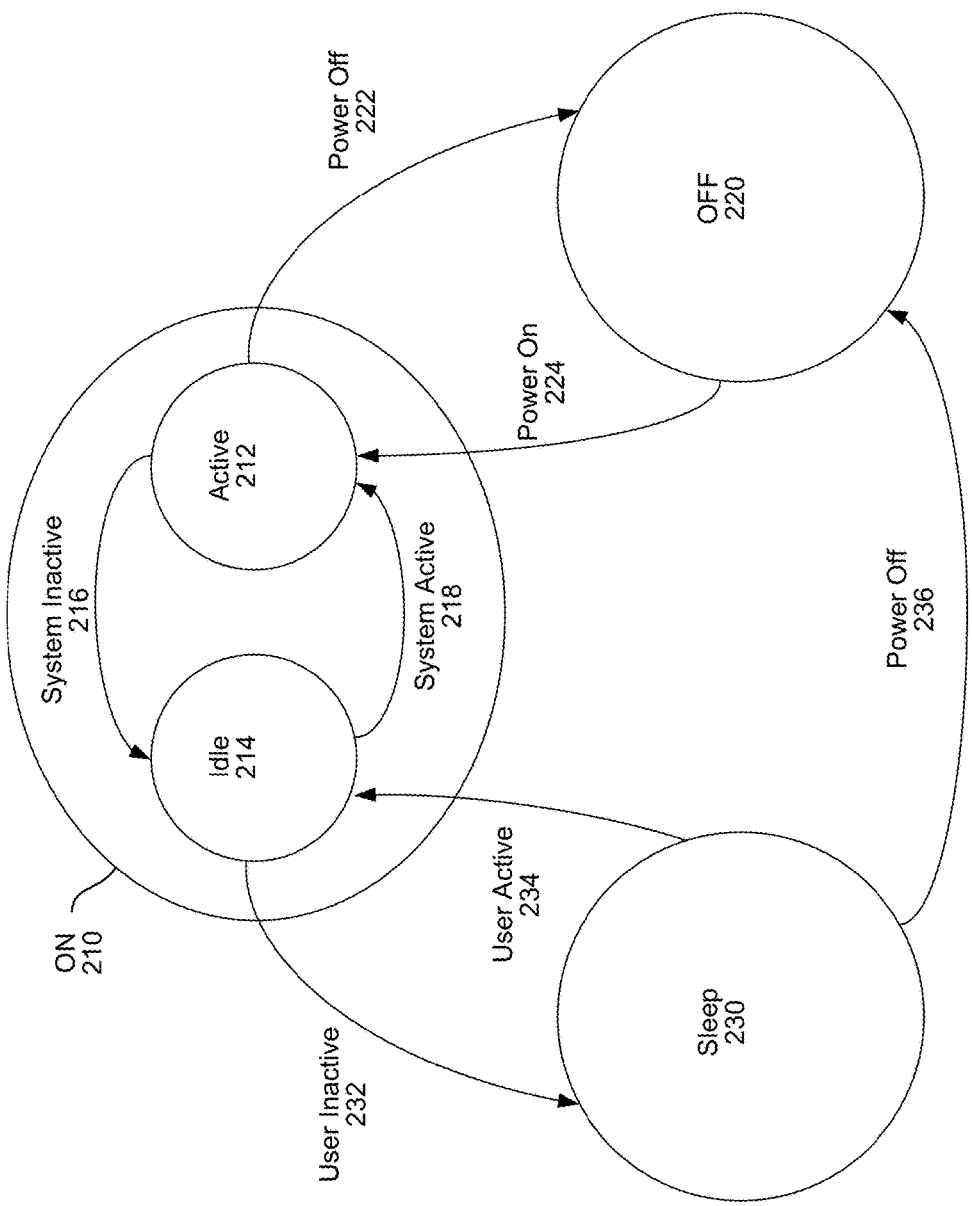

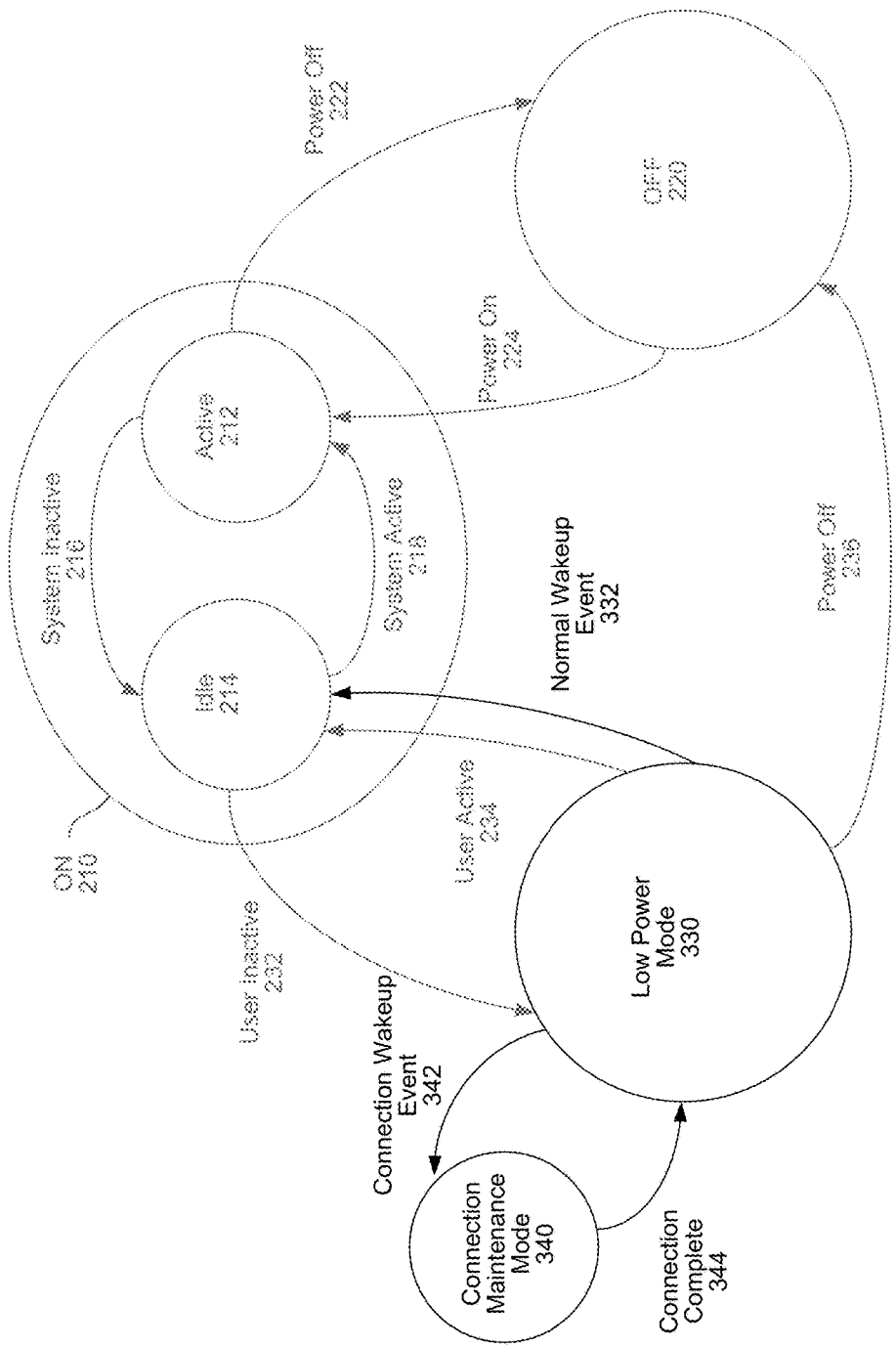

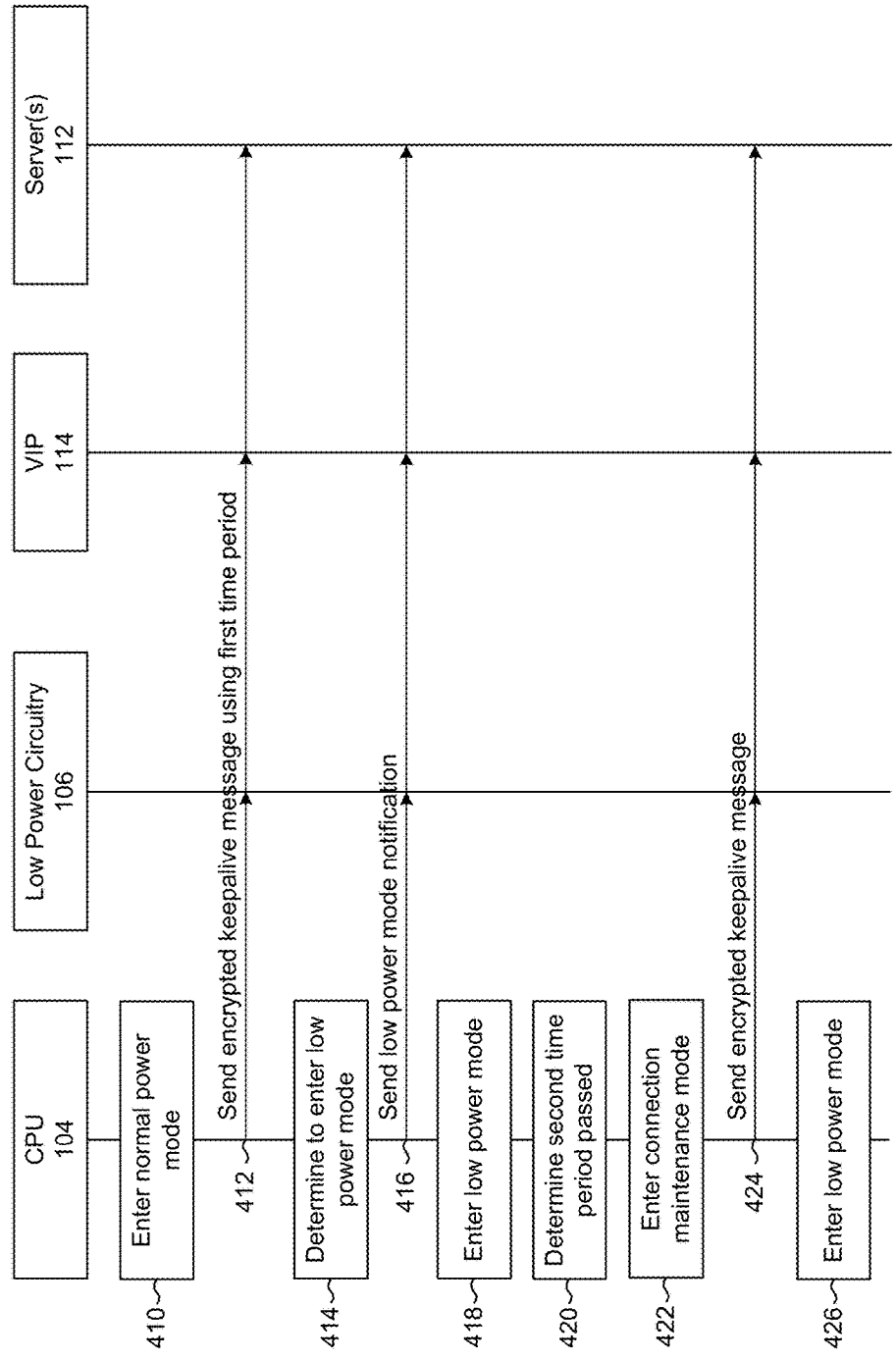

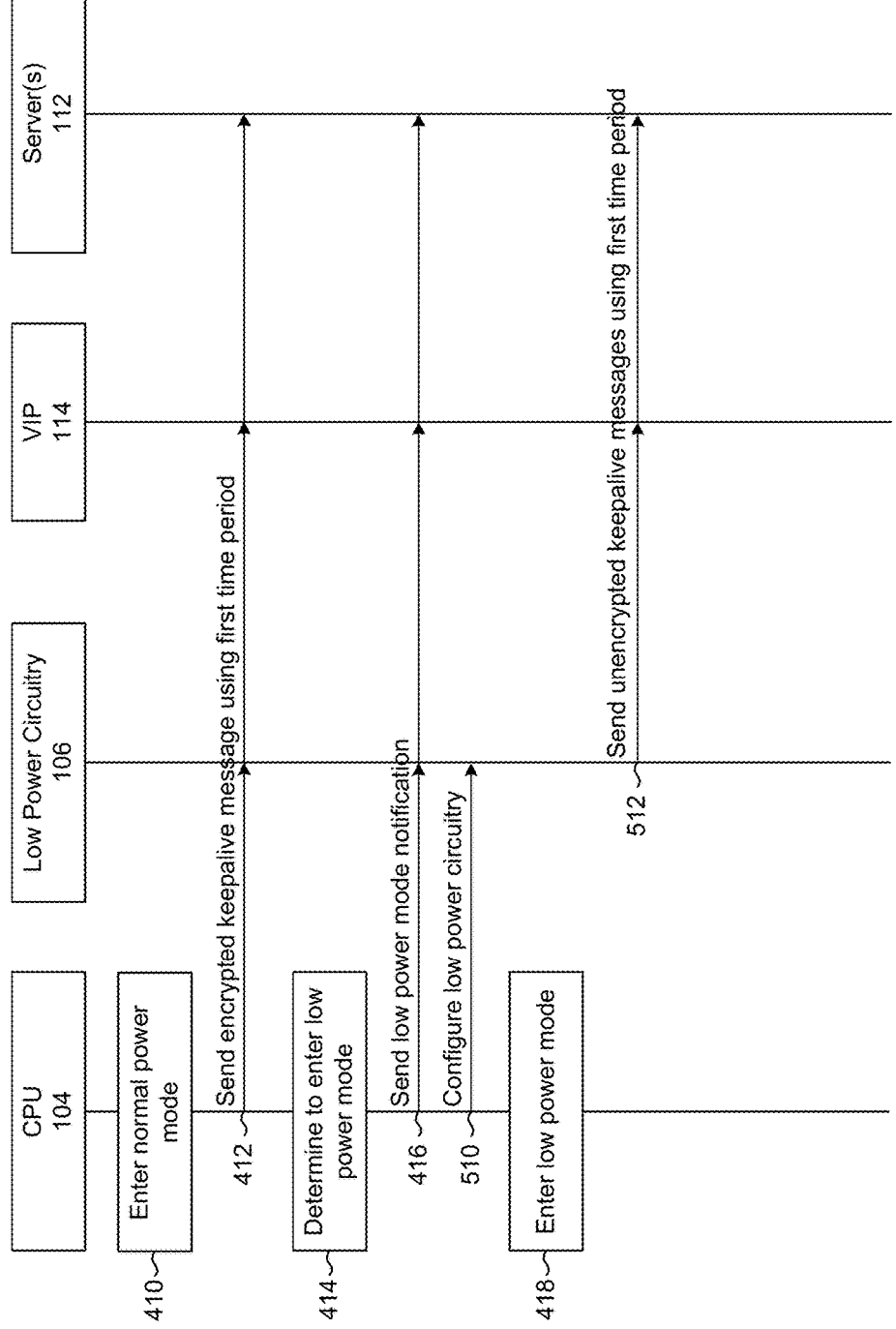

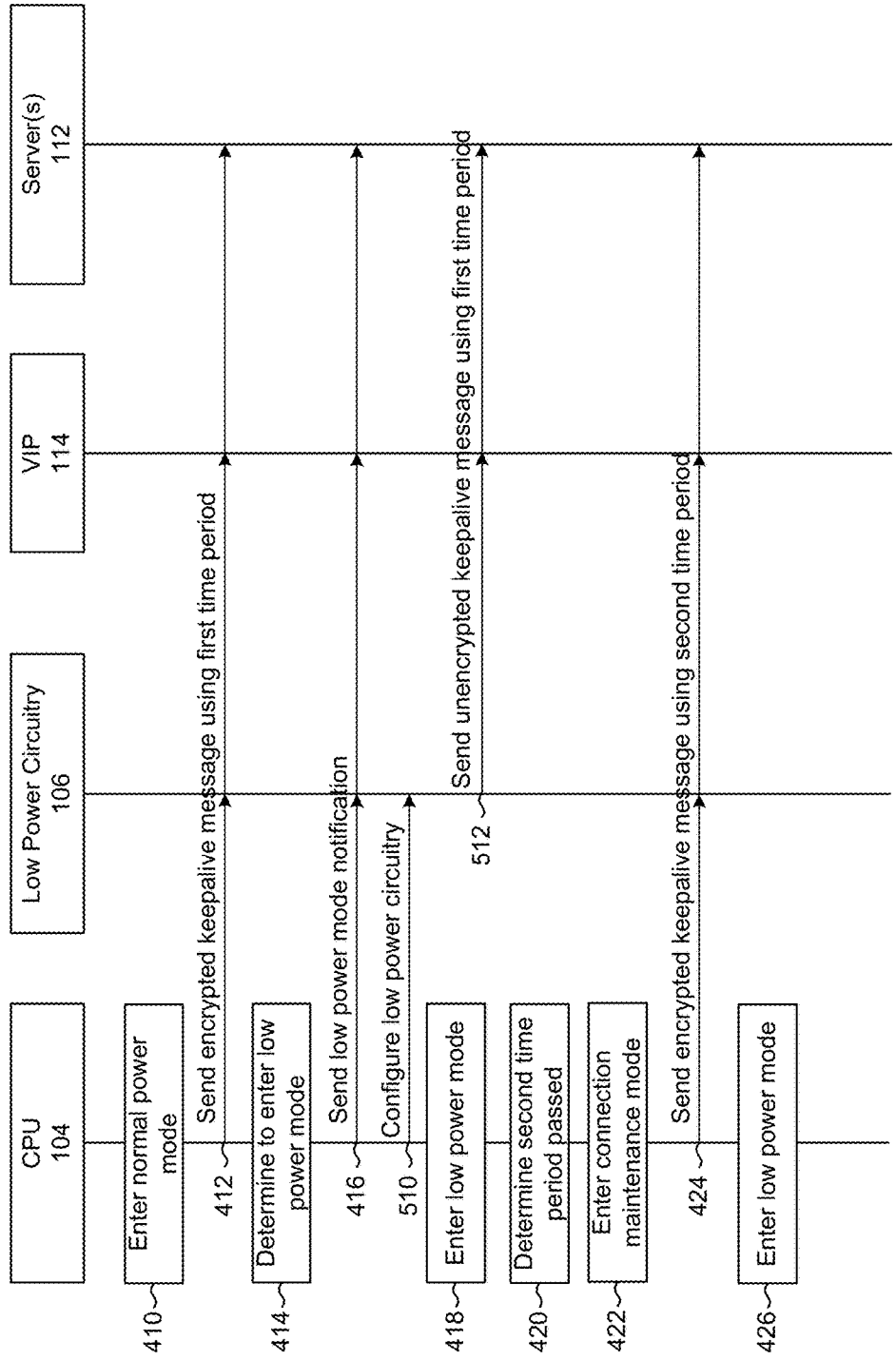

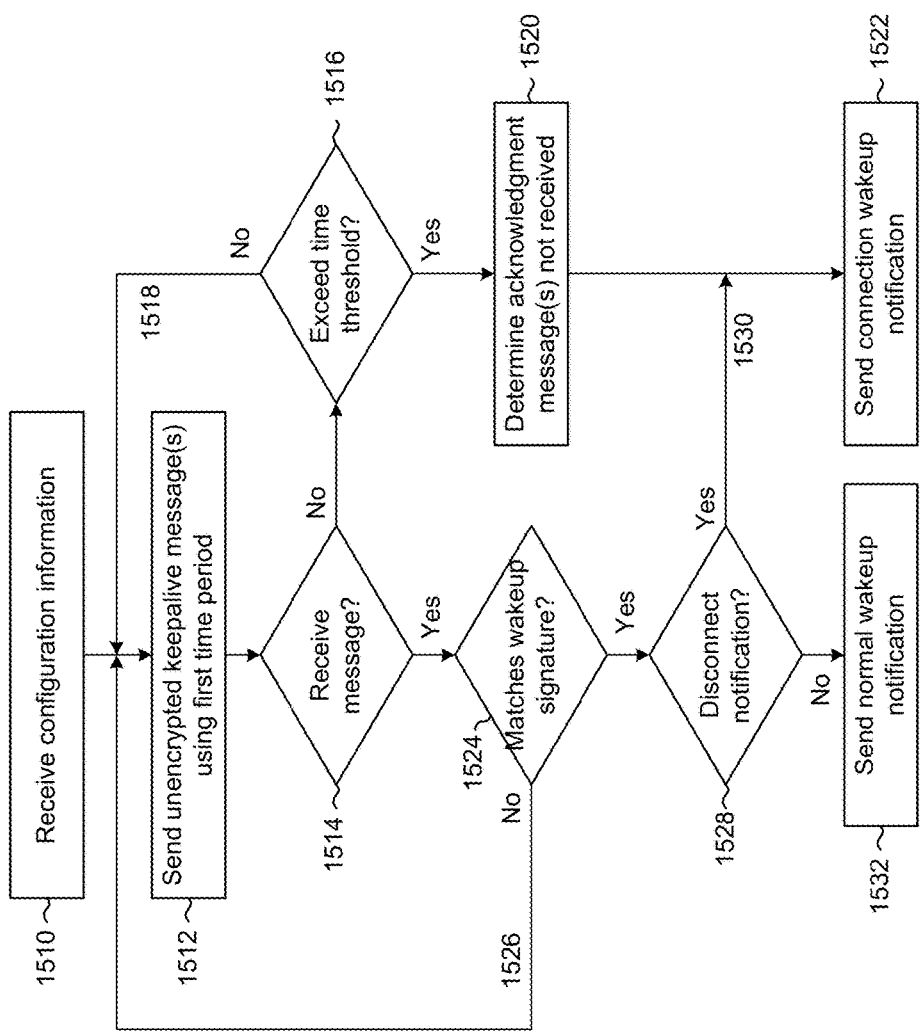

POWER EFFICIENT WIRELESS CONNECTIVITY

BACKGROUND

Electronic devices may be configured to connect to remote servers via a network while in an active state. The electronic devices may maintain the connection in order to improve device responsiveness, reduce a latency associated with responding to input commands and to enable additional functionality such as the ability to control the electronic devices remotely.

BRIEF DESCRIPTION OF DRAWINGS

For a more complete understanding of the present disclosure, reference is now made to the following description taken in conjunction with the accompanying drawings.

FIGS. 2A-2B illustrate a state diagram and a communication diagram associated with a sleep mode.

FIG. 3 is a state diagram illustrating a low power mode according to embodiments of the present disclosure.

FIG. 4 is a communication diagram that illustrates sending encrypted network messages at different intervals according to embodiments of the present disclosure.

FIG. 5 is a communication diagram that illustrates sending unencrypted network messages according to embodiments of the present disclosure.

FIG. 6 is a communication diagram that illustrates sending encrypted network messages at different intervals along with sending unencrypted network messages according to embodiments of the present disclosure.

FIG. 15 is a flowchart conceptually illustrating an example method for low power circuitry triggering wakeup events according to embodiments of the present disclosure.

DETAILED DESCRIPTION

Figure 1:
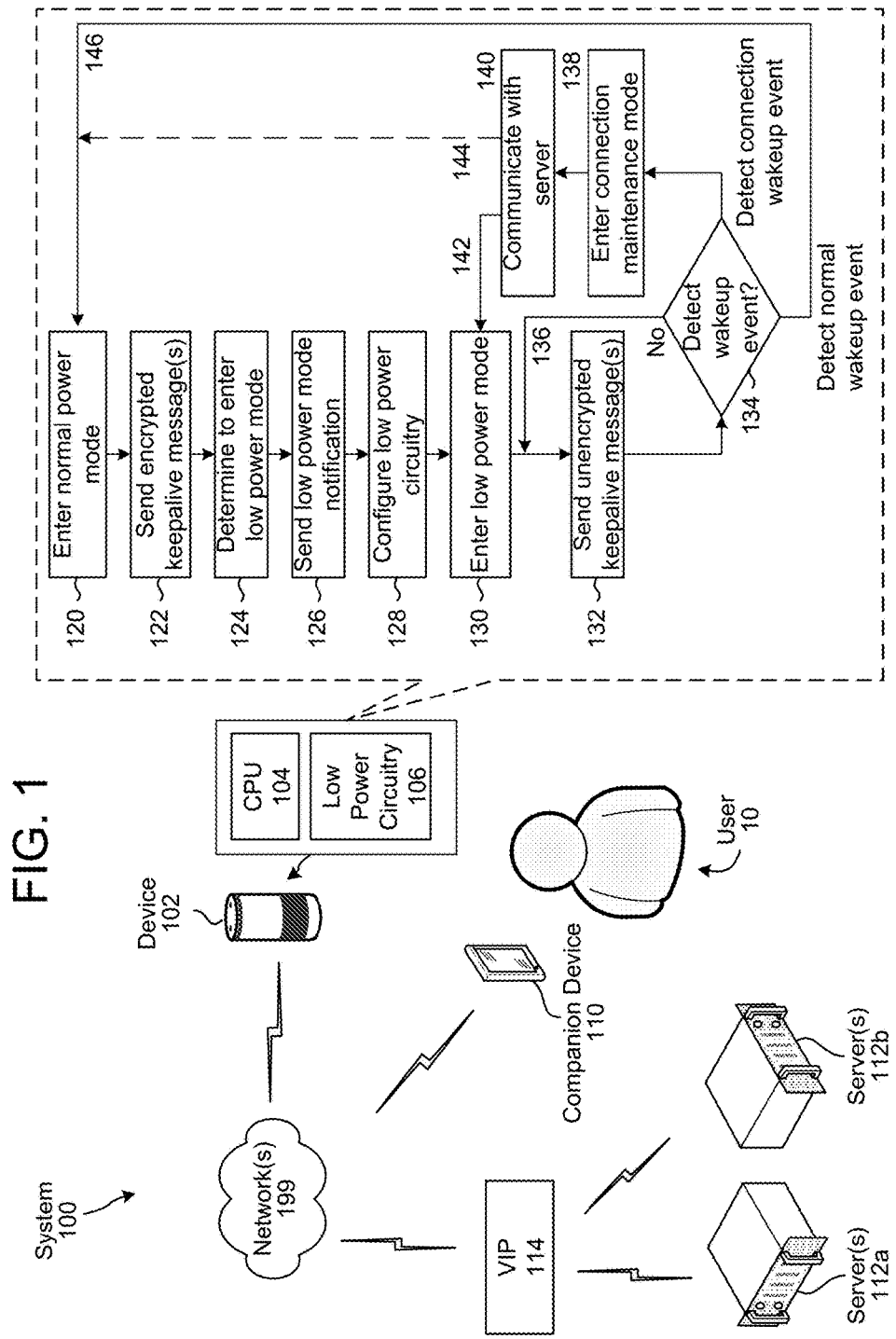
FIG. 1 illustrates a system for improving a low power mode according to embodiments of the present disclosure.

Electronic devices may be configured to connect to remote servers via a network while in an active state. The devices may maintain the connection in order to improve device responsiveness, reduce a latency associated with responding to input commands, and to enable additional functionality such as the ability to control the electronic devices remotely. Because the active state may consume energy (e.g., electrical power) a device may monitor user activity and/or system activity and enter a sleep state (e.g., a type of low power state) to conserve energy. While in the sleep state, however, the device might lose connection to the network and/or remote servers. After the connection is loss, transitioning from the sleep state to the active state may cause the user to experience a delay as the device reconnects to the network and/or remote server. In addition, when the device is in the sleep state, the user loses the ability to wake the device using the remote server and/or a companion application.

To improve user responsiveness and/or reduce energy consumption, devices, systems and methods may provide an improved sleep state (e.g., low power mode) that remains connected to a network and/or a remote server(s) while consuming less energy than while in the active state (e.g., normal power mode). Thus, a device in the low power mode may have reduced latency and improved user-perceivable responsiveness when transitioning from the low power mode to the normal power mode as the device may communicate with the remote server(s) with much less delay associated with reconnecting to the remote server(s). In addition, as the device maintains a connection with the remote server(s), the device may be controlled remotely in the low power mode. For example, the user may use a companion application running on an external device to send a command to the device via the remote server(s), enabling the user to wake the device from the low power mode and/or input other commands. Therefore, the device may consume less energy and/or have improved battery life as the device may enter the low power mode more frequently without substantially degrading a user experience and/or removing functionality.

To maintain a connection with the remote server(s), the device may send encrypted network messages at a first interval (e.g., every 30 seconds) while in the normal power mode (e.g., first mode) and may send the encrypted network messages at a second interval (e.g., every 5 minutes) while in the low power mode (e.g., second mode). For example, prior to entering the low power mode, the device may send a notification to the remote server(s) indicating the second interval and the device may set a timer using clock circuitry to trigger a wakeup event. The wakeup event may instruct the device to enter the normal power mode and/or a connection maintenance mode. For example, the device may enter the connection maintenance mode to communicate to the remote server(s) (e.g., send encrypted network messages and/or reconnect to the remote server(s)) and return to the low power mode without entering the normal power mode. Thus, the device may remain in the low power mode until the timer triggers the wakeup event, at which point the device may send an encrypted network message to the remote server(s). As the remote server(s) are aware that the device is in the low power mode, they maintain the connection based on the second interval instead of the first interval. In addition, the device may send unencrypted network messages to the remote server(s) to maintain the connection. For example, the device may send the unencrypted network messages using low power circuitry (e.g., wireless transceiver or the like) at the first interval while the device remains in the low power mode. While in the low power mode, the low power circuitry may receive messages from the remote server(s) and may trigger a wakeup event.

FIG. 1 illustrates a system 100 that includes a device 102 capable of entering a low power mode. Whether in a normal power mode (e.g., first mode) or the low power mode (e.g., second mode), the device 102 may remain connected to network(s) 199 and server(s) 112. For example, the device 102 may receive audio commands from a user 10, generate audio data corresponding to the audio commands and send the audio data to the server(s) 112. The server(s) 112 may perform automatic speech recognition (ASR) processing, natural language understanding (NLU) and/or other processing to determine a command corresponding to the audio data and may send an instruction to the device 102 to perform the command. As illustrated in FIG. 1, the system 100 may include one or more companion devices 110 local to user(s) 10, as well as one or more networks 199 and one or more server(s) 112 connected to the device 102 across the network(s) 199. Thus, the device 102 may receive messages from a companion device 110 controlled by a user 10, as well as from server(s) 112 (e.g., server(s) 112a and server(s) 112b) via a Virtual Internet Protocol (VIP) address 114. Therefore, the user 10 and/or server(s) 112 may control the device 102 remotely even when the device 102 is in the low power mode.

The device 102 may include a central processor unit (CPU) 104 and low power circuitry 106 (e.g., network interface such as a wireless transceiver, although the disclosure is not limited thereto). While in the normal power mode, the CPU 104 and the low power circuitry 106 may remain in an active state, consuming more energy than the low power mode but performing additional functionality. For example, the CPU 104 may send encrypted network messages to the server(s) 112 in the normal power mode. While in the low power mode, the low power circuitry 106 may remain in the active state but the CPU 104 may enter a low power state, reducing the energy consumption and functionality. For example, the low power circuitry 106 may send unencrypted network messages to the server(s) 112 in the low power mode.

The device 102 may be a portable electronic device (e.g., smartphone, tablet, laptop, voice-enabled device or the like) configured to operate using battery power, and the device 102 may enter the low power mode in order to reduce energy consumption and conserve the battery power. However, the disclosure is not limited thereto and the device 102 may be a wired electronic device with or without a battery. For example, the device 102 may be an appliance (e.g., washer, dryer, refrigerator, or the like), an entertainment device (e.g., television, speakers, video game console, or the like), computing device (e.g., desktop computer, server, external hard drive or the like) and/or consumer electronic device that may enter the low power mode in order to reduce energy consumption.

The CPU 104 may be one or more primary or application processors configured to execute an operating system, applications or the like. The CPU 104 is configured to transition between the normal power mode and the low power mode in order to reduce energy consumption. The normal power mode consumes more electrical power than the low power mode. The low power mode may also be referred to as "sleep" or "suspend mode" or the like.

The low power circuitry 106 may be a network interface or other circuitry on the device 102 that includes an interface processor configured to maintain a network connection while in the low power mode. For example, the low power circuitry 106 may be a wireless transceiver or other wireless network circuitry on the device 102. However, the disclosure is not limited thereto and the low power circuitry 106 may be a wired network interface or other component without departing from the disclosure. The low power circuitry 106 may consume less energy than the CPU 104 and may be configured to transition between a normal power mode and a low power mode. The low power circuitry 106 may be configured to establish a network connection with the network(s) 199 and exchange data and/or messages with devices (e.g., companion device 110 and/or server(s) 112) via the network(s) 199.

The low power circuitry 106 may be configured to block inbound data unless the device 102 has previously initiated a network connection. Thus, the server(s) 112 cannot initiate a network connection with the device 102, but the device 102 may initiate the network connection with the server(s) 112. Blocking the inbound data improves network security for the device 102 but may prevent legitimate resources such as the server(s) 112 from communicating directly with the device 102. For example, when the server(s) 112 have data to send to the device 102, the low power circuitry 106 may block this message.

To maintain a network connection to the server(s) 112, the device 102 may be configured to send keepalive data to the server(s) 112. Ongoing transmission of the keepalive data across the network(s) 199 maintains the network connection between the device 102 and the server(s) 112. For example, the device 102 may send encrypted keepalive messages including keepalive data at a first interval (e.g., every 30 seconds). The encrypted keepalive messages may be sent using cryptographic protocols such as Transport Layer Security (TLS), Secure Sockets Layer (SSL) or the like using network protocols such as Transmission Control Protocol (TCP)/Internet Protocol (IP) (hereinafter referred to as TCP/IP). In response receiving the encrypted keepalive messages, the server(s) 112 may send acknowledgement messages to the device 102. In some examples, the device 102 may send the encrypted keepalive messages to a specific server 112a to maintain a single connection. However, the disclosure is not limited thereto and the device 102 may send encrypted keepalive messages to multiple servers 112 to maintain multiple connections without departing from the disclosure. While the network connection is maintained, the server(s) 112 may communicate as needed with the device 102. However, if the server(s) 112 do not receive the encrypted keepalive messages for a first duration of time (e.g., 2 minutes), the server(s) 112 may send a notification to the device 102 that the server(s) 112 is closing the network connection. The device 102 may attempt to reconnect with the server(s) 112 to maintain the network connection. Similarly, if the device 102 does not receive the acknowledgement messages for a second duration of time (e.g., 2 minutes), the device 102 may attempt to reconnect with the server(s) 112 to maintain the network connection.

To reduce power consumption, the device 102 may enter the low power mode and send the encrypted keepalive messages including the keepalive data at a second interval (e.g., every 5 minutes). Prior to entering the low power mode, the device 102 may send an encrypted notification to the server(s) 112 indicating that the device 102 will be entering the low power mode and specifying the second interval. The device 102 may determine a duration of time associated with the second interval (e.g., 5 minutes) and the CPU 104 may set a timer using clock circuitry and enter the low power mode. After the duration of time elapses, the timer triggers a wakeup event that instructs the CPU 104 to enter the normal power mode or a connection maintenance mode to send an encrypted keepalive message. In the connection maintenance mode, the CPU 104 may send the encrypted keepalive message and reset the timer but doesn't perform other functionality, and once the encrypted keepalive message is sent the CPU 104 enters the low power mode. Thus, the CPU 104 may enter the connection maintenance mode, send the encrypted keepalive message, reset the timer for the duration of time and enter the low power mode. In contrast, if the device 102 enters the normal power mode the device 102 may send a notification to the server(s) 112 that the device 102 is in the normal power mode and/or perform other actions before entering the low power mode.

To reduce power consumption, the low power circuitry 106 may be configured by the CPU 104 to send the keepalive data while the CPU 104 is in the low power mode. For example, the low power circuitry 106 may send unencrypted keepalive messages including the keepalive data at the first interval (e.g., every 30 seconds). The unencrypted keepalive messages may be sent using network protocols (e.g., TCP/IP) but without cryptographic protocols (e.g., TLS, SSL or the like). However, the disclosure is not limited thereto and the low power circuitry 106 may send encrypted keepalive messages and/or send the keepalive data at a second interval without departing from the present disclosure. Prior to the device 102 sending the unencrypted keepalive messages to the server(s) 112, the device 102 may send an encrypted notification indicating to the server(s) 112 that the device 102 will be sending unencrypted keepalive messages in order to maintain the connection.

While the network connection between the device 102 and the server(s) 112 is maintained, the low power circuitry 106 may be configured to monitor incoming messages from the server(s) 112 and may trigger a wakeup event. For example, the low power circuitry 106 may receive a message matching a wakeup signature and may trigger a normal wakeup event that instructs the CPU 104 to wakeup (e.g., transition from the low power mode to the normal power mode). Once in the normal power mode, the application processor may communicate with the server or take other action. Additionally or alternatively, the low power circuitry 106 may trigger a connection wakeup event that instructs the CPU 104 to enter the connection maintenance mode, communicate with the server(s) 112 to maintain the connection and enter the low power mode without performing other functionality or entering the normal power mode. For example, in response to the server(s) 112 sending a message indicating that the connection will be ended unless the device 102 responds, the low power circuitry 106 may trigger the CPU 104 to enter the connection maintenance mode to communicate with the server(s) 112 and maintain the connection before returning to the low power mode. In contrast, if the CPU 104 enters the normal power mode the device 102 may send a notification to the server(s) 112 that the CPU 104 is in the normal power mode and/or perform other actions before entering the low power mode.

The wakeup signature may include a source address, destination address, source port and destination port associated with the connection between the device 102 and the VIP 114. Thus, the low power circuitry 106 may identify messages from the VIP 114 and trigger a wakeup event (or connection wakeup event) while ignoring messages from other source addresses/ports. For example, messages sent directly from the companion device 110 to the device 102 would not match the wakeup signature and therefore not trigger a wakeup event. However, if the companion device 110 sent a message to the server(s) 112 instructing the server(s) 112 to send a message to the device 102 via the VIP 114, the device 102 would receive the message from the VIP 114, determine that the message matched the wakeup signature and trigger a wakeup event. For example, the user 10 may use a companion application running on the companion device 110 to trigger the wakeup event of the device 102 and/or perform other commands.

In order to trigger the wakeup event, each of the server(s) 112 in communication with the device 102 may send messages to the device 102 via the VIP 114, such that a first message from a first server 112a has the same source address and source port as a second message from a second server 112b. Thus, the VIP 114 may be associated with the server(s) 112 and the device 102 may communicate with multiple server(s) 112 simultaneously via the VIP 114. For example, the first server 112a may be associated with a first service and/or application whereas the second server 112b may be associated with a second service and/or application. Additionally or alternatively, the second server 112b may be associated with the first service and/or application and may communicate with the device 102 at a later point in time than the first server 112a. In addition to the VIP 114, various networking devices (e.g., routers, firewalls, network address translators or the like) may process the data during transit between the device 102 and the server(s) 112 and/or companion device 110.

As illustrated in FIG. 1, the device 102 may enter (120) a normal power mode and send (122) encrypted keepalive message(s) to the server(s) 112 while in the normal power mode. At a certain point in time, the device 102 may determine (124) to enter the low power mode. For example, the device 102 may detect limited system activity and/or user activity for a duration of time and may transition to the low power mode to conserve energy. Additionally or alternatively, the device 102 may detect input (e.g., button press on the device 102, an instruction received from a companion application running on the companion device 110, or the like) instructing the device 102 to enter the low power mode.

Prior to entering the low power mode, the device 102 may send (126) a low power mode notification to the server(s) 112. The low power mode notification may inform the server(s) 112 that the device 102 is entering the low power mode in order to modify connection parameters. For example, the device 102 may transition from sending encrypted keepalive message(s) at a first time interval (e.g., every 30 seconds) to a second time interval (e.g., every 5 minutes), may transition from sending encrypted keepalive message(s) to sending unencrypted keepalive message(s), and/or may inform the server(s) 112 of the wakeup signature, a fixed payload and/or other message characteristics in use when the device 102 is in the low power mode. Using the wakeup signature, the server(s) 112 may send a message to the device 102 that triggers a wakeup event on the device 102 while the device 102 is in the low power mode. However, in some examples the wakeup signature may be fixed by the device 102 based on the connection between the device 102 and the VIP 114 and the server(s) 112 may not be aware of the wakeup signature. Using the fixed payload, the server(s) 112 may validate unencrypted keepalive message(s) that include the fixed payload.

The device 102 may configure (128) the low power circuitry and enter (130) the low power mode. For example, the CPU 104 may configure the low power circuitry 106 prior to entering the low power mode. In some examples, the CPU 104 may configure the low power circuitry 106 to send the unencrypted keepalive message(s) during the low power mode, including specifying the fixed payload, network and/or session parameters associated with the unencrypted keepalive messages or the like. Thus, the low power circuitry 106 may send (132) unencrypted keepalive message(s) to the server(s) 112, the unencrypted keepalive message(s) including the fixed payload, specific addresses associated with the server(s) 112 or the like.

Additionally or alternatively, the CPU 104 may configure the low power circuitry 106 with regard to wakeup events. In some examples, the CPU 104 may send the low power circuitry 106 a wakeup signature with which to monitor incoming messages. Thus, when the low power circuitry 106 receives a message matching the wakeup signature, the low power circuitry 106 may trigger a wakeup event for the CPU 104. As will be discussed in greater detail below, the wakeup signature may include a source address, a destination address, a source port and a destination port, although the disclosure is not limited thereto and the wakeup signature may include additional data.

In some examples, the CPU 104 may differentiate between a normal wakeup event (e.g., the CPU 104 transitions from the low power mode to the normal power mode) and a connection wakeup event (e.g., the CPU 104 transitions from the low power mode to the connection maintenance mode and back to the low power mode). For example, the low power circuitry 106 may initiate a connection wakeup event when the low power circuitry 106 doesn't receive an acknowledgement message from the server(s) 112 for a first duration of time, when the low power circuitry 106 receives a message from the server(s) 112 indicating that the connection will be closed, when a second duration of time elapses, and/or in response to other conditions. When the device 102 sends a keepalive message (encrypted and/or unencrypted) to the server(s) 112, the server(s) 112 respond with an acknowledgement message acknowledging receipt of the keepalive message. Thus, when the low power circuitry 106 doesn't receive an acknowledgement message from the server(s) 112 for the first duration of time, the low power circuitry 106 may determine that the device 102 is not communicating to the server(s) 112 and may trigger the connection wakeup event for the CPU 104 to reconnect to the server(s) 112 before resuming the low power mode. Similarly, when the low power circuitry 106 receives the message from the server(s) 112 indicating that the connection will be closed, the low power circuitry 106 may trigger the connection wakeup event for the CPU 104 to maintain the connection to the server(s) 112 before resuming the low power mode. Finally, the second duration of time may be associated with the second interval at which the CPU 104 sends encrypted keepalive messages during the low power mode. Thus, the low power circuitry 106 may set a timer or otherwise monitor the second duration of time and trigger a connection wakeup event when the second duration of time has elapsed.

While the above example describes the low power circuitry 106 being configured to trigger a connection wakeup event based on contents of messages received from the server(s) 112 (e.g., when the low power circuitry 106 receives a message from the server(s) 112 indicating that the connection will be closed), the disclosure is not limited thereto. For example, the low power circuitry 106 may trigger a normal wakeup event for any message that matches the wakeup signature, and the CPU 104 may determine whether the message requires establishing/maintaining a connection to the server(s) 112 or performing other actions. Thus, the low power circuitry 106 may not identify messages from the server(s) 112 indicating that the connection will be closed, but may instead trigger the normal wakeup event when the messages match the wakeup signature and the CPU 104 may determine what action(s) to perform. Additionally or alternatively, the low power circuitry 106 may not determine when the second duration of time elapses. Instead, the CPU 104 and/or other circuitry (e.g., clock circuitry included in the CPU 104 or elsewhere on the device 102) may set a timer corresponding to the second duration of time and may trigger a connection wakeup event when the second duration of time elapses. Further, the disclosure is not limited to triggering a connection wakeup event when the second duration of time elapses, and the CPU 104, the low power circuitry 106 and/or other circuitry may trigger a normal wakeup event instead.

As illustrated in FIG. 1, the device 102 may determine (134) if a wakeup event is detected (e.g., detection of a wakeword). A wakeup event may include a connection wakeup event and/or a normal wakeup event. If the device 102 determines that a wakeup event is not detected, the device 102 may loop (136) to step 132 and remain in the low power mode. If the device 102 determines that a connection wakeup event is detected, the device 102 may enter (138) the connection maintenance mode and communicate (140) with the server(s) 112 before looping (142) to step 130 and entering the low power mode. However, while communicating with the server in step 140, the device 102 may receive first messages requiring the device 102 to perform additional operations. If the device 102 receives these first messages, the device 102 may loop (144) to step 120 and enter the normal power mode to perform the additional operations. Additionally or alternatively, if the device 102 determines that a normal wakeup event is detected, the device 102 may loop (146) to step 120 and enter the normal power mode. The device 102 may continue to operate in the normal power mode until determining to enter the low power mode again.

While FIG. 1 illustrates the device 102 differentiating between a normal wakeup event and a connection wakeup event, the disclosure is not limited thereto and the device 102 may only detect normal wakeup events. For example, the low power circuitry 106 may initiate a normal wakeup event upon receiving a message matching the wakeup signature, when the low power circuitry 106 doesn't receive the acknowledgement message from the server(s) 112 for the first duration of time, when the low power circuitry 106 receives the message from the server(s) 112 indicating that the connection will be closed, when the second duration of time elapses, and/or in response to the other conditions. Therefore, instead of entering the connection maintenance mode and returning to the low power mode after communicating with the server(s) 112, the device 102 may instead enter the normal power mode and determine to enter the low power mode at a later point in time.

In some examples, the connection maintenance mode may be included as part of the low power mode, such that the device 102 remains in the low power mode while communicating with the server(s) 112 to establish/maintain the connection. Thus, the device 102 remains in the low power mode and doesn't send a notification to the server(s) 112 that the device 102 is entering the normal power mode, and/or other external indications (e.g., buttons, lights, or the like on the device 102) may correspond to the low power mode. In other examples, the connection maintenance mode may be included as part of the normal power mode, such that the device 102 enters the normal power mode to communicate with the server(s) 112 and then transitions back to the low power mode at a later point in time. Thus, the device 102 may send a notification to the server(s) 112 that the device 102 is entering the normal power mode and enter the normal power mode, and/or other external indications (e.g., buttons, lights, or the like on the device 102) may correspond to the normal power mode.

Figure 2B:
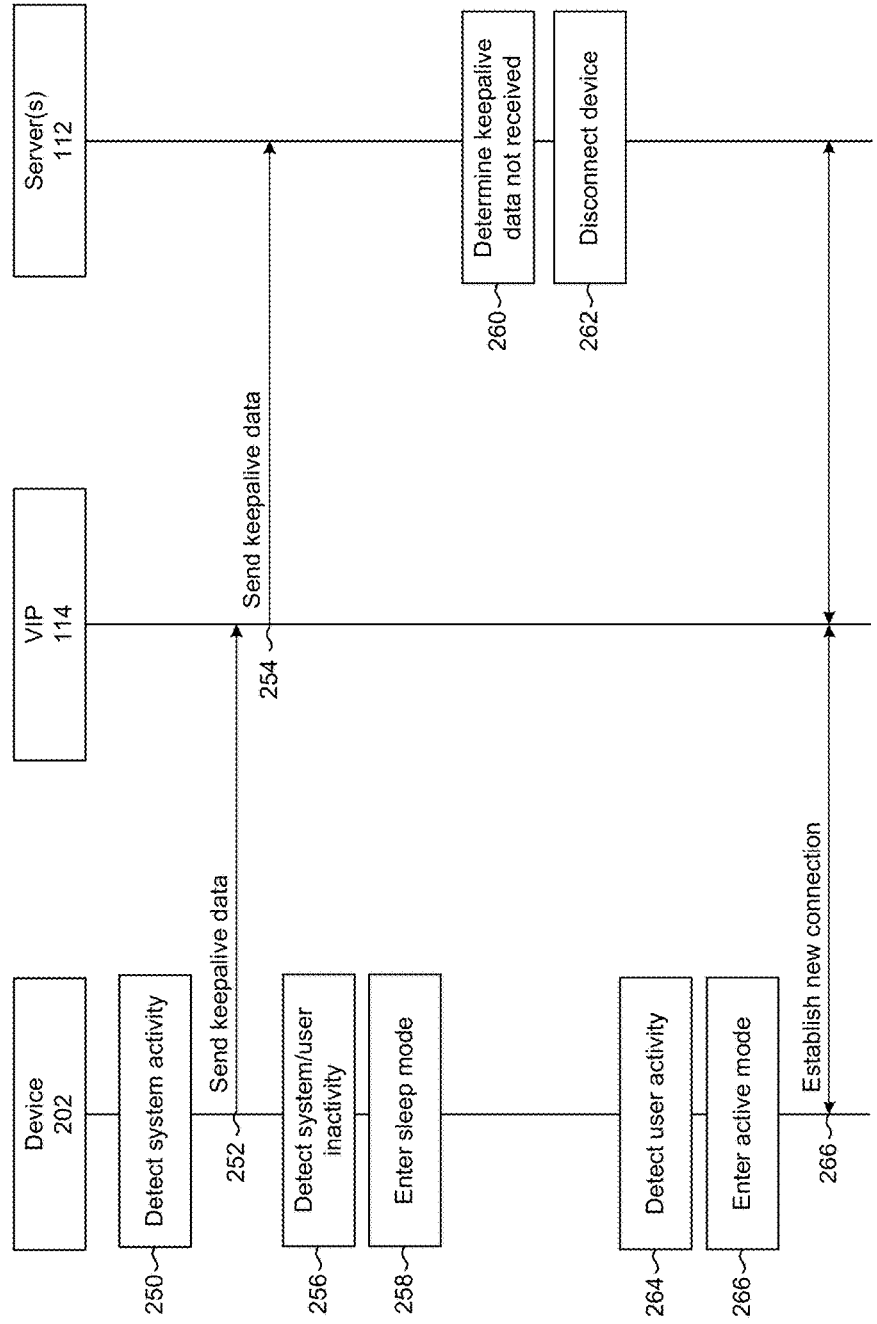

FIGS. 2A-2B illustrate a state diagram and a communication diagram associated with a sleep mode. As illustrated in FIG. 2A, the state diagram includes an "On" state 210, an "Off" state 220 and a "Sleep" state 230.

Within the "On" state 210, the state diagram includes an "Active On" state 212 and an "Idle On" state 214. For example, the "Active On" state 212 may correspond to when a device 202 is active, whether performing user requested processes or background processes, whereas the "Idle On" state 214 may correspond to when the device 202 is idle, performing neither user requested process or background processes. When in the "Active On" state 212, the device 202 may use external indications to indicate that the device 202 is active, such as powering on first Light Emitting Diodes (LEDs) or the like. Similarly, when in the "Idle On" state 214, the device 202 may use external indications to indicate that the device 202 is idle, such as powering on second LEDs or the like. For example, the device 202 may provide power to a first number of LEDs in the "Active On" state 212 and provide power to a second, smaller, number of LEDs in the "Idle On" state 214.

The device 202 may transition from the "Active On" state 212 to the "Idle On" state 214 in response to a "System Inactive" command 216 (e.g., when the device 202 determines that the system is inactive) and may transition from the "Idle On" state 214 to the "Active On" state 212 in response to a "System Active" command 218 (e.g., when the device 202 determines that the system is active). The device 202 may determine that the system is active or inactive based on a duration of time without system activity or other techniques known to one of skill in the art. The device 202 may consume more energy in the "Active On" state 212 than in the "Idle On" state 214. For example, in the "Active On" state 212 a processor may be on, memory may auto-refresh, system clocks, buses, phase locked loops (PLLs) and other internal circuitry may be on. In contrast, in the "Idle On" state 214, the processor may be in a low power mode, the memory may auto-refresh and the system clocks, buses, PLLs and other internal circuitry may be in a reduced voltage mode, such as operating at a lower frequency than in the "Active On" state 212.

The "Off" state 220 may consume the least amount of energy, as the processor, memory, system clocks, buses, PLLs and other internal circuitry may be powered off. The device 202 may transition from the "On" state 210 to the "Off" state 220 in response to a "Power Off" command 222, which may correspond to a power off command (e.g., an instruction received by the device 202, a long button press on an external power button or the like), when a battery level is below a first threshold (e.g., 25%) and the device 202 detects no user activity for a period of time (e.g., 24 hours) or when the battery level is below a second threshold (e.g., 0%). The device 202 may transition from the "Off" state 220 to the "On" state 210 in response to a "Power on" command 224, which corresponds to receiving an input (e.g., a short or long button press on the external power button) and/or detecting a physical connection (e.g., the user plugging a Universal Serial Bus (USB) cable or Line-in to the device 202).

The "Sleep" state 230 may consume more energy than the "Off" state 220 but less energy than the "On" state 210. For example, the "Sleep" state 230 may correspond to a low power mode in which the processor is gated, the memory self-refreshes, and the system clocks, buses, PLLs and other internal circuitry (e.g., wireless transceiver) may be powered off. The device 202 may transition from the "On" state 210 to the "Sleep" state 230 in response to a "User Inactive" command 232 (e.g., when the device 202 determines that the user is inactive for a period of time (e.g., 24 hours), when the battery level is below a third threshold (e.g., 5%), in response to a command from the user instructing the device 102 to enter the "Sleep" state 230 (e.g., button press, input received from companion application, etc.), or the like). The device 202 may transition from the "Sleep" state 230 to the "On" state 210 in response to the "User Active" command 234, which corresponds to receiving an input (e.g., a short or long button press on any external button) and/or detecting a physical connection (e.g., the user plugging the USB cable or Line-in to the device 202). The device 202 may transition from the "Sleep" state 230 to the "Off" state 220 in response to the "Power Off" command 236, which corresponds to receiving a physical power off command (e.g., detecting a long button press on an external power button or the like).

Using the state diagram illustrated in FIG. 2A, a device 202 may reduce energy consumption by entering the "Sleep" state 230. However, in the "Sleep" state 230 the device 202 powers off internal circuitry such as a wireless transceiver or other network adapters and the device 202 loses connections to the server(s) 112. Therefore, the device 202 loses functionality and cannot receive messages from the server(s) 112 and/or be controlled remotely by a companion application and/or the server(s) 112. Thus, the device 202 enters the "Sleep" state 230 only after determining that the device 202 hasn't detected user activity for a relatively long duration of time, such as 24 hours.

FIG. 2B illustrates a communication diagram for the device 202 using the state diagram of FIG. 2A. As illustrated in FIG. 2B, the device 202 may detect (1250) system activity and send (1252) keepalive data to the VIP 114, which may send (1254) the keepalive data to the server(s) 112. The device 202 may be configured to send the keepalive data at a first interval (e.g., every 30 seconds) while in the "On" state 210. Upon receiving the keepalive data, the server(s) 112 may send an acknowledgement message (not illustrated) to the device 202 to confirm receipt of the keepalive data. While the server(s) 112 receives the keepalive data, the server(s) 112 may maintain a connection between the device 202 and the server(s) 112.

However, the device 202 may detect (256) system/user inactivity (e.g., detect the "User Inactive" command 232) and may enter (258) sleep mode (e.g., "Sleep" state 230). During the sleep mode, the device 202 may power off network adapters and therefore the device 202 doesn't send keepalive data to the VIP 114 and/or the server(s) 112. The server(s) 112 may maintain the connection until the server(s) 112 determine that the keepalive data has not been received for a duration of time. For example, if the device 202 sends the keepalive data at the first interval (e.g., every 30 seconds), the server(s) 112 may maintain the connection until the server(s) 112 determine that the keepalive data is not received for a fixed number of cycles (e.g., three cycles) and/or a fixed duration of time (e.g., 2 minutes). Therefore, the server(s) 112 may determine (260) that the keepalive data is not received for the fixed number of intervals (e.g., three intervals of 30 seconds each) and/or the duration of time (e.g., 2 minutes) and the server(s) 112 may disconnect (262) the device 202.

While the device 202 is disconnected from the server(s) 112, the device 202 cannot receive messages from the server(s) 112 and/or respond to remote commands. Thus, the device 202 may only respond to local commands input to the device 202, such as input on an external button. At a later point in time, the device 202 may detect (264) user activity (e.g., a button press or connection of USB/line-in cable) and may enter (266) an active mode (e.g., normal power mode). After entering the active mode, the device 202 may establish (266) a new connection with the server(s) 112, which may result in a latency and reduced user responsiveness as perceived by the user 10. For example, the device 202 may need to establish the connection prior to performing functionality and/or responding to user commands and establishing the connection may require a fixed amount of time (e.g., 5-10 seconds). Therefore, the user 10 may perceive the latency and/or reduced user responsiveness as sluggishness of the device 202 when transitioning from the sleep mode to the active mode.

To reduce the latency and/or improve user responsiveness, FIG. 3 is a state diagram illustrating a low power mode according to embodiments of the present disclosure. As illustrated in FIG. 3, "Sleep" state 230 is replaced by Low Power Mode 330, which maintains connectivity to the server(s) 112 while consuming less energy than the "On" state 210. As illustrated in FIG. 3, the "On" state 210 and "Off" state 220 (and corresponding transitions between states) are identical to the state diagram illustrated in FIG. 2A and a corresponding description is therefore omitted.

Low power mode 330 may consume more energy than the "Off" state 220 but less energy than the "On" state 210. For example, the low power mode 330 may corresponds to a low power mode in which the processor is gated, the memory self-refreshes, the system clocks, buses, PLLs and other internal circuitry may be powered off. In contrast to the "Sleep" state 230, however, the low power mode 330 may maintain power to low power circuitry (e.g., wireless transceiver or other circuitry) and the device may be operating using the low power circuitry, such as low power circuitry 106. Therefore, while in the low power mode, the device 102 may maintain a connection to the server(s) 112 using the low power circuitry 106 while the processor (e.g., CPU 104) is in a low power mode.

The device 102 may transition from the "On" state 210 to the low power mode 330 in response to a "User Inactive" command 232, as described above with regard to FIG. 2A. However, as the device 102 maintains a connection to the server(s) 112 and therefore may receive messages and/or be controlled remotely via the server(s) 112, the device 102 may enter the low power mode more aggressively, such as when the device 102 determines that the user is inactive for a second period of time (e.g., 5 minutes) that is much shorter than the first period of time (e.g., 24 hours) used to enter the "Sleep" state 230.

As illustrated in FIG. 3, the device 102 may transition from the low power mode 330 to the "On" state 210 in response to the "User Active" command 234 (as described above with regard to FIG. 2A) and a normal wakeup event 332, which may be triggered by the low power circuitry 106. For example, the low power circuitry 106 may monitor incoming messages and trigger the normal wakeup event 332 when a message matches a wakeup signature. As will be discussed in greater detail below, the wakeup signature may include a source address, a destination address, a source port and a destination port, although the disclosure is not limited thereto and the wakeup signature may include additional data. In response to the normal wakeup event 332, the device 102 may transition from the low power mode 330 to the "On" state 210 (e.g., normal power mode) and may perform operations and/or other functionality with reduced latency perceived by the user. For example, the user 10 may use a companion application running on the device 10 to instruct the server(s) 112 to send a command to the device 102 to trigger the normal wakeup event 332 and instruct the device 102 to play music. Thus, while in the low power mode 330, the device 102 may transition to the normal power mode and play the music requested by the user 10.

Additionally or alternatively, the low power circuitry 106 may trigger the normal wakeup event 332 for connection maintenance. For example, the low power circuitry 106 may initiate a connection wakeup event when the low power circuitry 106 doesn't receive an acknowledgement message from the server(s) 112 for a first duration of time, when the low power circuitry 106 receives a message from the server(s) 112 indicating that the connection will be closed, when a second duration of time associated with sending encrypted keepalive messages elapses, and/or in response to other conditions. When the device 102 sends a keepalive message (encrypted and/or unencrypted) to the server(s) 112, the server(s) 112 respond with an acknowledgement message acknowledging receipt of the keepalive message. Thus, when the low power circuitry 106 doesn't receive an acknowledgement message from the server(s) 112 for the first duration of time, the low power circuitry 106 may determine that the device 102 is not communicating to the server(s) 112 and may trigger the normal wakeup event 332 so that the device 102 may enter the normal voltage mode and reconnect to the server(s) 112. Similarly, when the low power circuitry 106 receives the message from the server(s) 112 indicating that the connection will be closed, the low power circuitry 106 may trigger the normal wakeup event 332 so that the device 102 may enter the normal voltage mode and maintain the connection to the server(s) 112. Finally, the second duration of time may be associated with a second interval at which the device 102 sends encrypted keepalive messages during the low power mode 330. Thus, the low power circuitry 106 may set a timer or otherwise monitor the second duration of time and trigger the normal wakeup event 332 when the second duration of time has elapsed.

In some examples, the device 102 may differentiate between the normal wakeup event 332 and a connection wakeup event 342, which corresponds to the connection maintenance described above. For example, the low power circuitry 106 may trigger the connection wakeup event 342 so that the device 102 enters the connection maintenance mode 340 to establish and/or maintain connection to the server(s) 112 and then, in response to a connection complete 344 command, transition back to the low power mode 330. Thus, the device 102 maintains the connection using the connection maintenance mode 340 without entering the "On" state 210 (e.g., normal power mode) and/or sending a notification to the server(s) 112 that the device 102 is in the normal power mode.

For example, the low power circuitry 106 may initiate the connection wakeup event 342 when the low power circuitry 106 doesn't receive an acknowledgement message from the server(s) 112 for a first duration of time, when the low power circuitry 106 receives a message from the server(s) 112 indicating that the connection will be closed, when a second duration of time associated with sending the encrypted keepalive messages elapses, and/or in response to other conditions. When the device 102 sends a keepalive message (encrypted and/or unencrypted) to the server(s) 112, the server(s) 112 respond with an acknowledgement message acknowledging receipt of the keepalive message. Thus, when the low power circuitry 106 doesn't receive an acknowledgement message from the server(s) 112 for the first duration of time, the low power circuitry 106 may determine that the device 102 is not communicating to the server(s) 112 and may trigger the connection wakeup event 342 for the device 102 to enter the connection maintenance mode 340 and reconnect to the server(s) 112 before resuming the low power mode 330. Similarly, when the low power circuitry 106 receives the message from the server(s) 112 indicating that the connection will be closed, the low power circuitry 106 may trigger the connection wakeup event 342 for the device 102 to enter the connection maintenance mode 340 and maintain the connection to the server(s) 112 before resuming the low power mode 330. Finally, the second duration of time may be associated with the second interval at which the CPU 104 sends encrypted keepalive messages during the low power mode 330. Thus, the low power circuitry 106 may set a timer or otherwise monitor the second duration of time and trigger the connection wakeup event 342 for the device 102 to enter the connection maintenance mode 340 and send the encrypted keepalive message when the second duration of time has elapsed.

In order to enable additional functionality (e.g., control the device 102 remotely) and/or reduce latency or improve user responsiveness when transitioning from the low power mode 330 to the normal power mode (e.g., "On" state 210), the device 102 may be configured to maintain a connection with the server(s) 112 during the low power mode 330. The device 102 may maintain the connection with the server(s) 112 and/or enable additional functionality using multiple techniques, as described in greater detail below. For example, the device 102 may maintain the connection to the server(s) 112 by sending encrypted keepalive messages at a different interval during the low power mode 330, the low power circuitry 106 may maintain the connection to the server(s) 112 by sending unencrypted keepalive messages during the low power mode 330 and/or triggering the normal wakeup event 332/connection wakeup event 342, and the low power circuitry 106 may monitor incoming messages and trigger the normal wakeup event 332 to enable the additional functionality.

FIG. 4 is a communication diagram that illustrates sending encrypted network messages at different intervals according to embodiments of the present disclosure. In order to maintain the connection between the device 102 and the server(s) 112, the device 102 may send encrypted keepalive messages at a first interval (e.g., every 30 seconds) in the normal power mode. However, sending the encrypted keepalive messages may require that the device 102 be in the normal power mode, and entering the normal power mode to send messages at the first interval negates the reduction in energy consumption of the low power mode. Therefore, the device 102 may send the encrypted keepalive messages at a second interval (e.g., every 5 minutes) in the low power mode.

As illustrated in FIG. 4, the CPU 104 may enter (410) the normal power mode and may send (412) the encrypted keepalive messages to the server(s) 112 (via the low power circuitry 106 and the VIP 114) using a first time period (e.g., 30 seconds) that corresponds to the first interval. The CPU 104 may determine (414) to enter the low power mode and may send (416) a low power mode notification to the server(s) 112 indicating a second interval that corresponds to a second time period (e.g., 5 minutes). The CPU 104 may enter (418) the low power mode and operate in a low power mode to reduce energy consumption. At a later point in time, the CPU 104 may determine (420) that the second time period has passed, enter (422) the connection maintenance mode, send (424) an encrypted keepalive message and enter (426) the low power mode again. In some examples, the CPU 104 may determine that the second time period has elapsed by setting a timer using clock circuitry included in the CPU 104, the low power circuitry 106 and/or other components on the device 102. However, the disclosure is not limited thereto and the CPU 104 may determine that the second time period has elapsed using techniques known to one of skill in the art. Thus, the CPU 104 may continue to transition from the low power mode to the connection maintenance mode and send the encrypted keepalive messages based on the second time period.

FIG. 5 is a communication diagram that illustrates sending unencrypted network messages according to embodiments of the present disclosure. As discussed above, the CPU 104 may send the encrypted keepalive messages using cryptographic protocols such as Transport Layer Security (TLS), Secure Sockets Layer (SSL) or the like using network protocols such as Transmission Control Protocol (TCP)/Internet Protocol (IP) (hereinafter referred to as TCP/IP). In contrast, the low power circuitry 106 may send unencrypted keepalive messages using network protocols (e.g., TCP/IP) but without cryptographic protocols (e.g., TLS, SSL or the like). For purposes of illustrating a primary example embodiment, the drawings and corresponding descriptions illustrate the CPU 104 sending encrypted keepalive messages and the low power circuitry 106 sending unencrypted keepalive messages. However, in other examples the keepalive messages sent from the CPU 104 may not be encrypted and/or the keepalive messages sent by the low power circuitry 106 may be encrypted without departing from the present disclosure. For example, the low power circuitry 106 may send encrypted keepalive messages at the first interval during the low power mode 330 without departing from the disclosure.

As illustrated in FIG. 5, the CPU 104 may enter (410) the normal power mode and may send (412) the encrypted keepalive messages to the server(s) 112 (via the low power circuitry 106 and the VIP 114) using a first time period (e.g., 30 seconds) that corresponds to the first interval. The CPU 104 may determine (414) to enter the low power mode and may send (416) a low power mode notification to the server(s) 112 indicating that the low power circuitry 106 will send unencrypted keepalive messages using the first time period.

The CPU 104 may configure (510) the low power circuitry 106 by sending network and/or session parameters to the low power circuitry 106, along with the first time period and other data required to send the unencrypted keepalive messages. The CPU 104 may enter (418) the low power mode and, while the CPU 104 is in the low power mode, the low power circuitry 106 may send (512) the unencrypted keepalive messages using the first time period.

FIG. 6 is a communication diagram that illustrates sending encrypted network messages at different intervals along with sending unencrypted network messages according to embodiments of the present disclosure. While FIG. 4 illustrates the CPU 104 sending the encrypted keepalive messages using the second time period and FIG. 5 illustrates the low power circuitry 106 sending the unencrypted keepalive messages using the first time period, FIG. 6 illustrates both examples occurring simultaneously.

As illustrated in FIG. 6, the CPU 104 may enter (410) the normal power mode and may send (412) the encrypted keepalive messages to the server(s) 112 (via the low power circuitry 106 and the VIP 114) using a first time period (e.g., 30 seconds) that corresponds to the first interval. The CPU 104 may determine (414) to enter the low power mode and may send (416) a low power mode notification to the server(s) 112 indicating that the CPU 104 will send encrypted keepalive messages using a second time period and that the low power circuitry 106 will send unencrypted keepalive messages using the first time period.

The CPU 104 may configure (510) the low power circuitry 106 by sending network and/or session parameters to the low power circuitry 106, along with the first time period and other data required to send the unencrypted keepalive messages. The CPU 104 may enter (418) the low power mode and, while the CPU 104 is in the low power mode, the low power circuitry 106 may send (512) the unencrypted keepalive messages using the first time period. While the low power circuitry 106 sends the unencrypted keepalive messages using the first time period, the CPU 104 may send the encrypted keepalive messages using the second time period. For example, the CPU 104 may determine (420) that the second time period has passed, enter (422) the connection maintenance mode, send (424) an encrypted keepalive message and enter (426) the low power mode again.

Using the techniques illustrated in FIGS. 4, 5 and/or 6, the device 102 may send encrypted/unencrypted keepalive messages in order to maintain a connection to the server(s) 112 during the low power mode.

Figure 7:
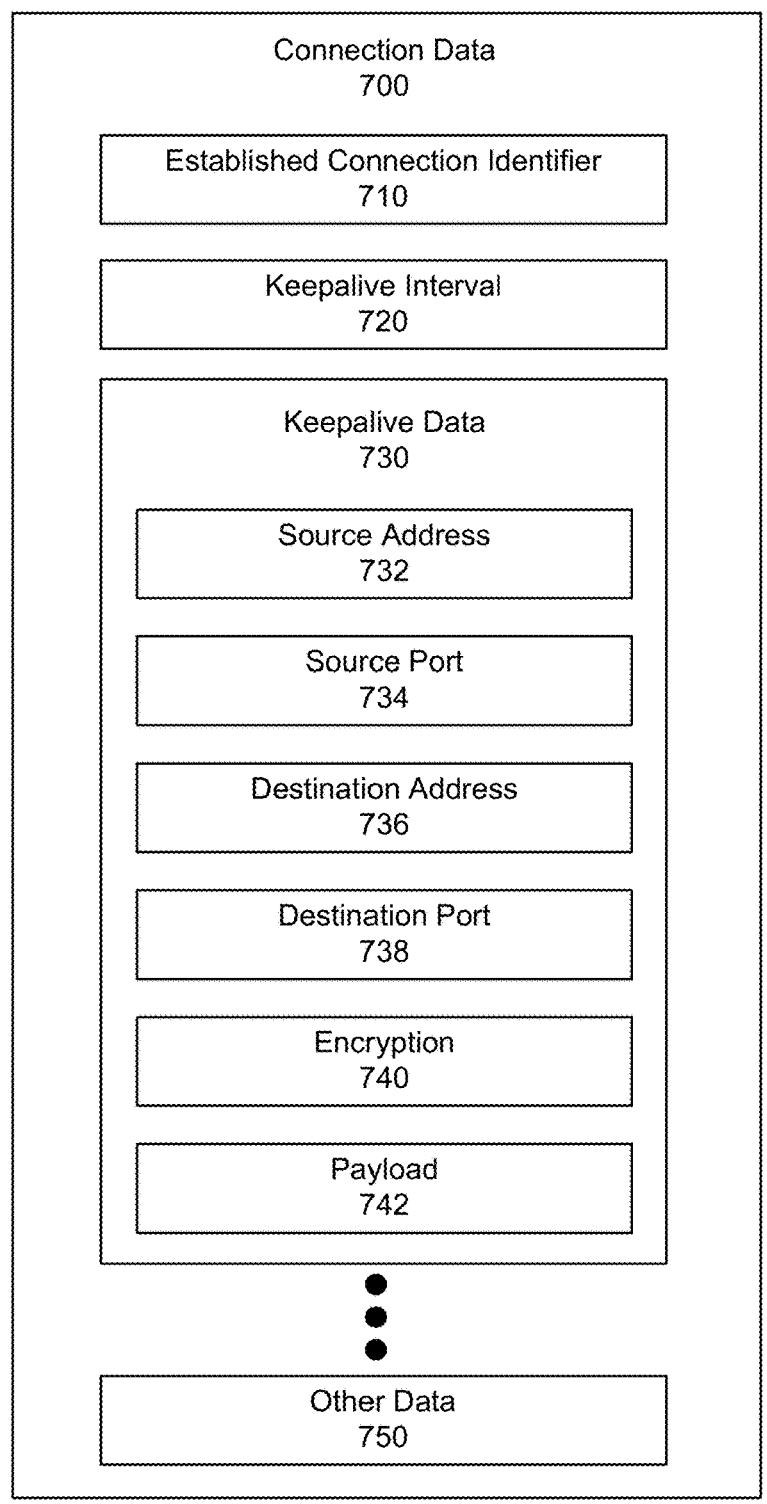
FIG. 7 illustrates an example of connection data according to embodiments of the present disclosure.

FIG. 7 illustrates an example of connection data according to embodiments of the present disclosure. Connection data 700 may provide information to the low power circuitry 106 for use in maintaining an established network connection. For example, the CPU 104 may send the connection data 700 to the low power circuitry 106 in order to configure the low power circuitry 106 to send keepalive messages to the server(s) 112. In some examples, the connection data 700 may be provided to the low power circuitry 106 using an application programming interface ("API") provided by an operating system of the device 102.

As illustrated in FIG. 7, the connection data 700 may include an established connection identifier 710, a keepalive interval 720, keepalive data 730 and other data 750. The established connection identifier 710 may identify a particular connection, such as a connection between the device 102 and a first server 112a. In some examples, the device 102 may be connected to multiple servers 112 (e.g., 112a, 112b, etc.) simultaneously and the CPU 104 may send connection data 700 (e.g., 700a, 700b, etc.) corresponding to each server 112. The keepalive interval 720 may define an interval of time between transmission of the keepalive data. For example, the device 102 may send encrypted keepalive messages using a first keepalive interval 720a (e.g., 30 seconds) in the normal power mode, may send encrypted keepalive messages using a second keepalive interval 720b (e.g., 5 minutes) in the low power mode and may send unencrypted keepalive messages using the first keepalive interval 720a in the low power mode. As described herein, examples of keepalive intervals may be illustrated as rounded numbers, such as 30 seconds or 5 minutes. However, the disclosure is not limited thereto and actual keepalive intervals may be specific numbers, such as 27 seconds or 4.5 minutes without departing from the present disclosure. In some examples, the low power circuitry 106 may be configured to test different intervals with a particular server 112x in order to determine a keepalive interval 720 in which bidirectional communication with the server 112x is maintained but which minimizes transmissions.

The connection data 700 may also include keepalive data 730, which may include one or more of a source address 732, a source port 734, a destination address 736, a destination port 738, encryption 740 and/or a payload 742. The source address 732 may specify an address of the device 102 on the network(s) 199, such as an IP address. The source port 734 may specify a particular TCP or UDP port, although the disclosure is not limited thereto and the protocols may vary. The destination address 736 may specify an address of the server 112x on the network(s) 199, such as an IP address. The destination port 738 may specify a particular TCP or UDP port, although the disclosure is not limited thereto and the protocols may vary. In some examples, the connection data 730 may indicate the protocol (e.g., TCP, UDP, etc.) such that the low power circuitry 106 may send the keepalive data 730 as a TCP packet, a UDP packet or the like. In some examples, the keepalive data 730 may be encrypted. The connection data 730 may include the encryption 740 information such as keys, initialization vectors or the like. The keepalive data 730 may also include a payload 742, such as a current battery state, last known geographic location or the like. In some examples, the unencrypted keepalive messages may specify a fixed payload 742 known to the server(s) 112 in order to validate the keepalive data. Additionally or alternatively, the other data 750 may be included in the connection data 700. For example, an established connection may have an expiration time such that after a given interval or a particular count of transmitted keepalive data 730, the low power circuitry 106 may discontinue sending keepalive messages.

Figure 8:
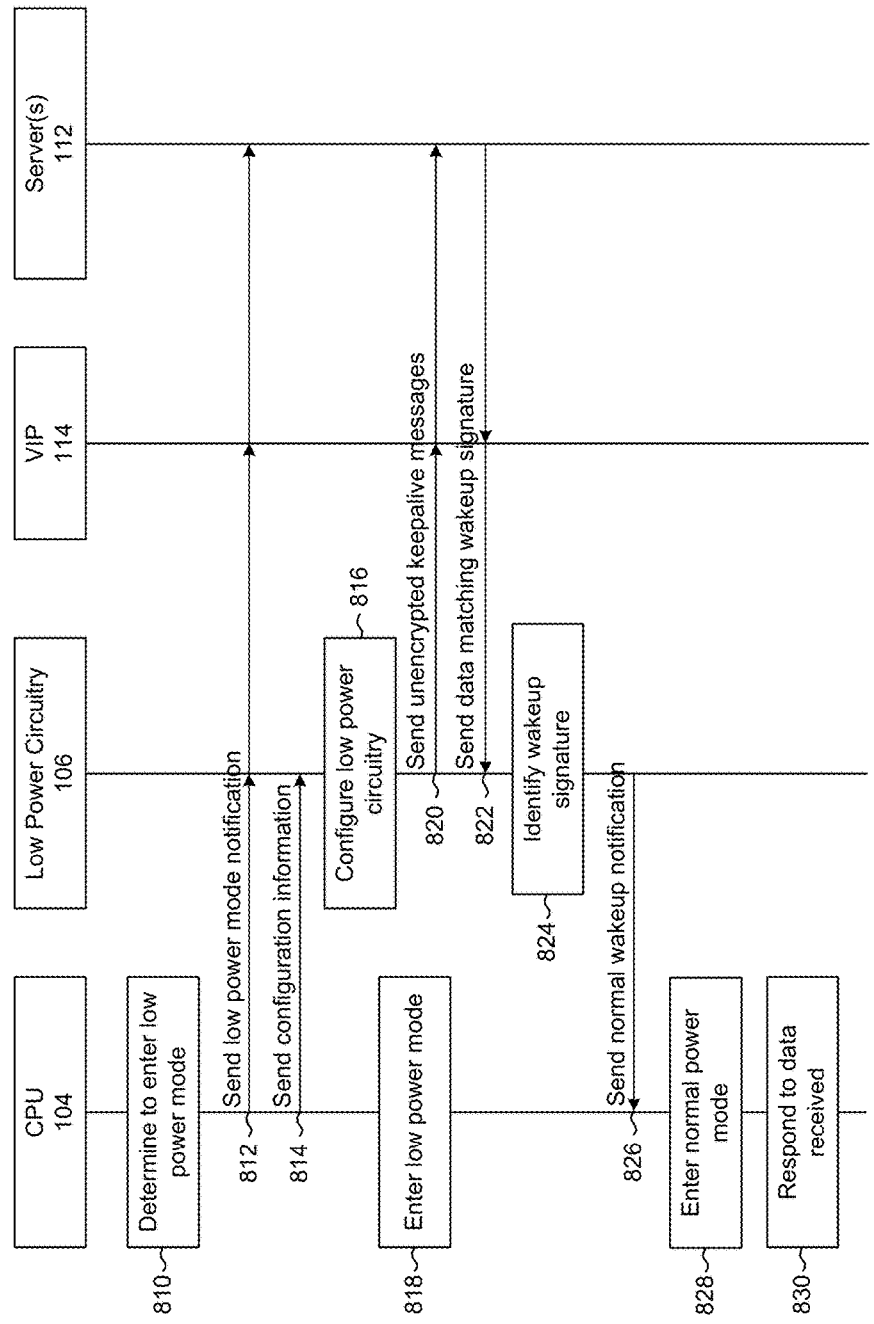
FIG. 8 is a communication diagram illustrating a wakeup event according to embodiments of the present disclosure.

While the connection to the server(s) 112 is maintained, the device 102 may enable additional functionality, such as allowing the user 10 to control the device 102 remotely. FIG. 8 is a communication diagram illustrating a wakeup event according to embodiments of the present disclosure. As illustrated in FIG. 8, the CPU 104 may determine (810) to enter a low power mode, may send (812) a low power mode notification to the server(s) 112, and may send (814) configuration information to the low power circuitry 106, including an instruction to trigger a normal wakeup event when an incoming message matches a wakeup signature. The low power circuitry 106 may configure (816) the low power circuitry 106 and the CPU 104 may enter (818) the low power mode.

While the CPU 104 is in the low power mode, the low power circuitry 106 may send (820) unencrypted keepalive messages to the server(s) 112. However, as discussed above, the present disclosure is not limited thereto and the low power circuitry 106 may send encrypted keepalive messages to the server(s) 112 without departing from the disclosure. In some examples, the low power circuitry 106 may send keepalive messages (encrypted or unencrypted) including a payload to identify current session communication. Therefore, the keepalive message may be sent without encryption protocols (e.g., unencrypted) but the payload may be encrypted. While in the low power mode, the server(s) 112 may send (822) data matching a wakeup signature to the low power circuitry 106. The low power circuitry 106 may identify (824) the wakeup signature (e.g., determine that the data matches the wakeup signature) and may send (826) a normal wakeup notification to the CPU 104. The CPU 104 may enter (828) a normal power mode and may respond (830) to the data received.

Figure 9:
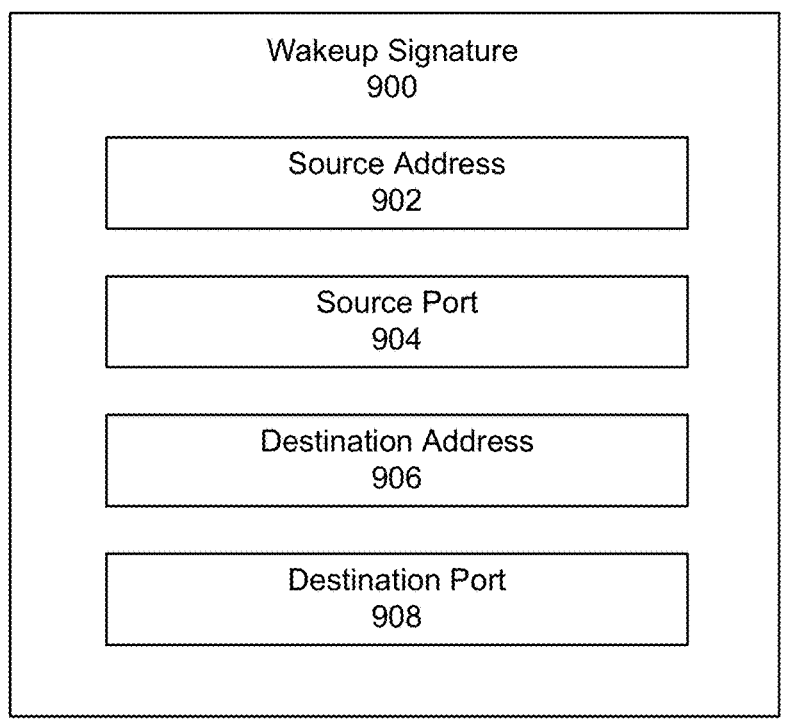
FIG. 9 illustrates an example of a wakeup signature according to embodiments of the present disclosure.

FIG. 9 illustrates an example of a wakeup signature according to embodiments of the present disclosure. As illustrated in FIG. 9, a wakeup signature 900 may include a source address 902, a source port 904, a destination address 906, and a destination port 908. One or more wakeup signatures 900 may be provided by the CPU 104 to the low power circuitry 106 to trigger the normal wakeup event. The low power circuitry 106 may be configured to compare data such as the data received from the server(s) 112 to the one or more wakeup signatures 900. When the comparison indicates a match, the low power circuitry may generate the normal wakeup notification to transition the CPU 104 from the low power mode to the normal power mode. The low power circuitry 106 may use the wakeup signature 900 to define what received data will trigger or not trigger the normal wakeup event.

The source address 902 may indicate the address or addresses from which the data may be received. For example, the data received from an IP address of 172.16.12.02 may be acceptable for triggering the normal wakeup event, while data received from 172.16.12.04 may not. Similarly, the destination address 906 may indicate a valid destination address associated with the data. The source port 904 may indicate a port of the server(s) 112 from which the data was sent and the destination port 908 may indicate a port of the device 102 to which the data was sent. However, the disclosure is not limited thereto and the source port 904 may be a virtual port or the like and may not correspond to a port on the server(s) 112. When the data matches the wakeup signature 900, the low power circuitry 106 may be configured to trigger the normal wakeup event and transition the CPU 104 from the low power mode to the normal power mode. In some examples, the data may include additional data indicating a particular application and/or specified command and the device 102 may open the particular application and/or perform the specified command.

In some examples, the device 102 may configure the low power circuitry 106 to trigger multiple wakeup events using multiple wakeup signatures 900. For example, a first wakeup signature 900a may include a first source port 904a and a second wakeup signature 900b may include a second source port 904b. Thus, the low power circuitry 106 may trigger a first wakeup event using the first wakeup signature 900a and may trigger a second wakeup event using the second wakeup signature 900b. Additionally or alternatively, multiple wakeup signatures 900 may include different source addresses 902 and/or destination ports 908 to trigger individual wakeup events without departing from the disclosure.

Figure 10:
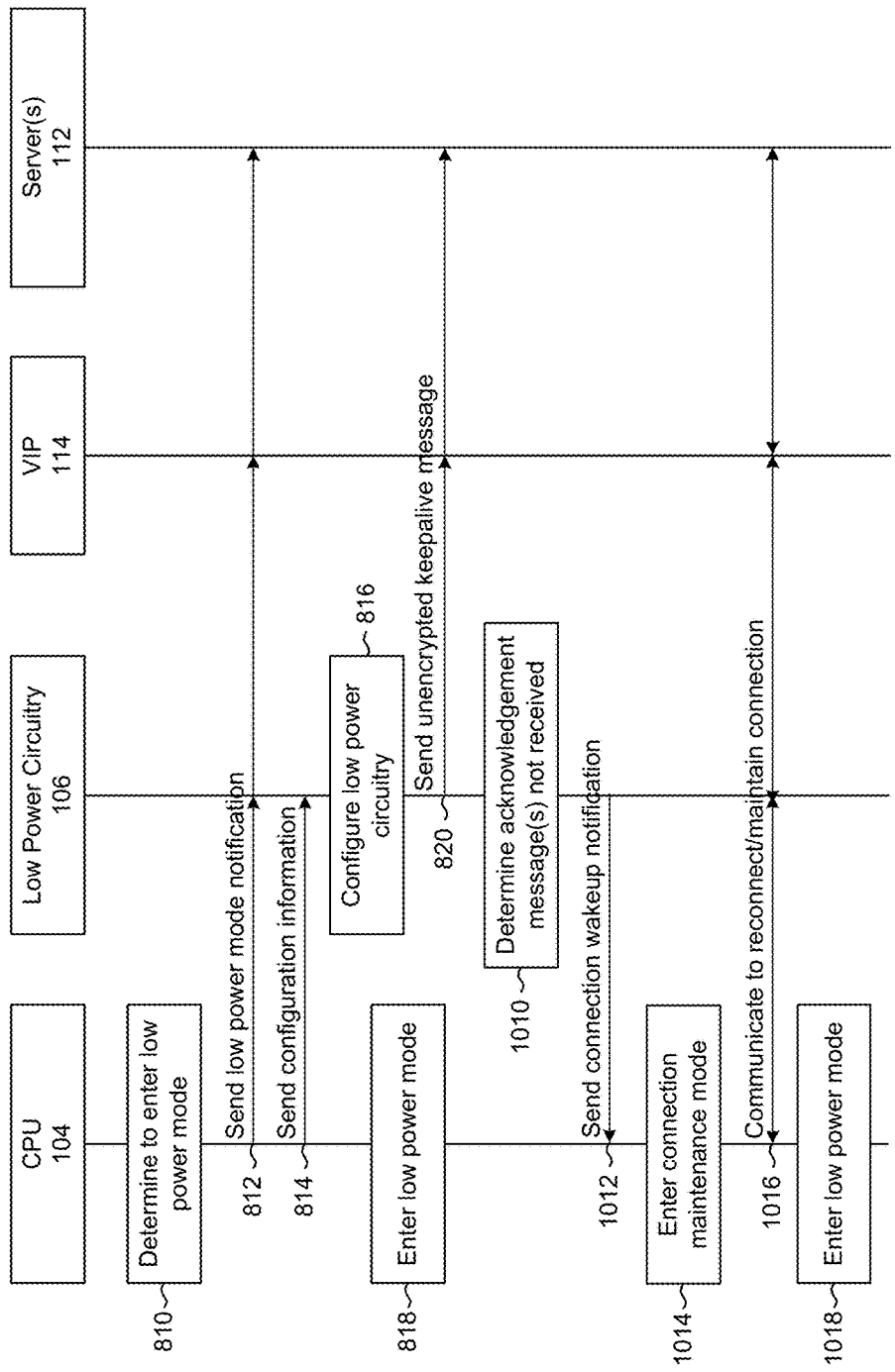
FIG. 10 is a communication diagram illustrating a communication event according to embodiments of the present disclosure.

FIG. 10 is a communication diagram illustrating a communication event according to embodiments of the present disclosure. As illustrated in FIG. 10, the CPU 104 may determine (810) to enter a low power mode, may send (812) a low power mode notification to the server(s) 112, and may send (814) configuration information to the low power circuitry 106, including an instruction to trigger a normal wakeup event when an incoming message matches a wakeup signature. The low power circuitry 106 may configure (816) the low power circuitry 106 and the CPU 104 may enter (818) the low power mode.

While the CPU 104 is in the low power mode, the low power circuitry 106 may send (820) unencrypted keepalive messages to the server(s) 112. Typically, the server(s) 112 sends an acknowledgement message in response to keepalive messages, indicating that the keepalive messages were received. The low power circuitry 106 may determine (1010) that acknowledgement message(s) were not received for a fixed duration of time (e.g., 2 minutes) and may send (1012) a connection wakeup notification to the CPU 104. The CPU 104 may enter (1014) a connection maintenance mode, communicate (1016) to reconnect/maintain connection to the server(s) 112 and may enter (1018) the low power mode.

Figure 11:
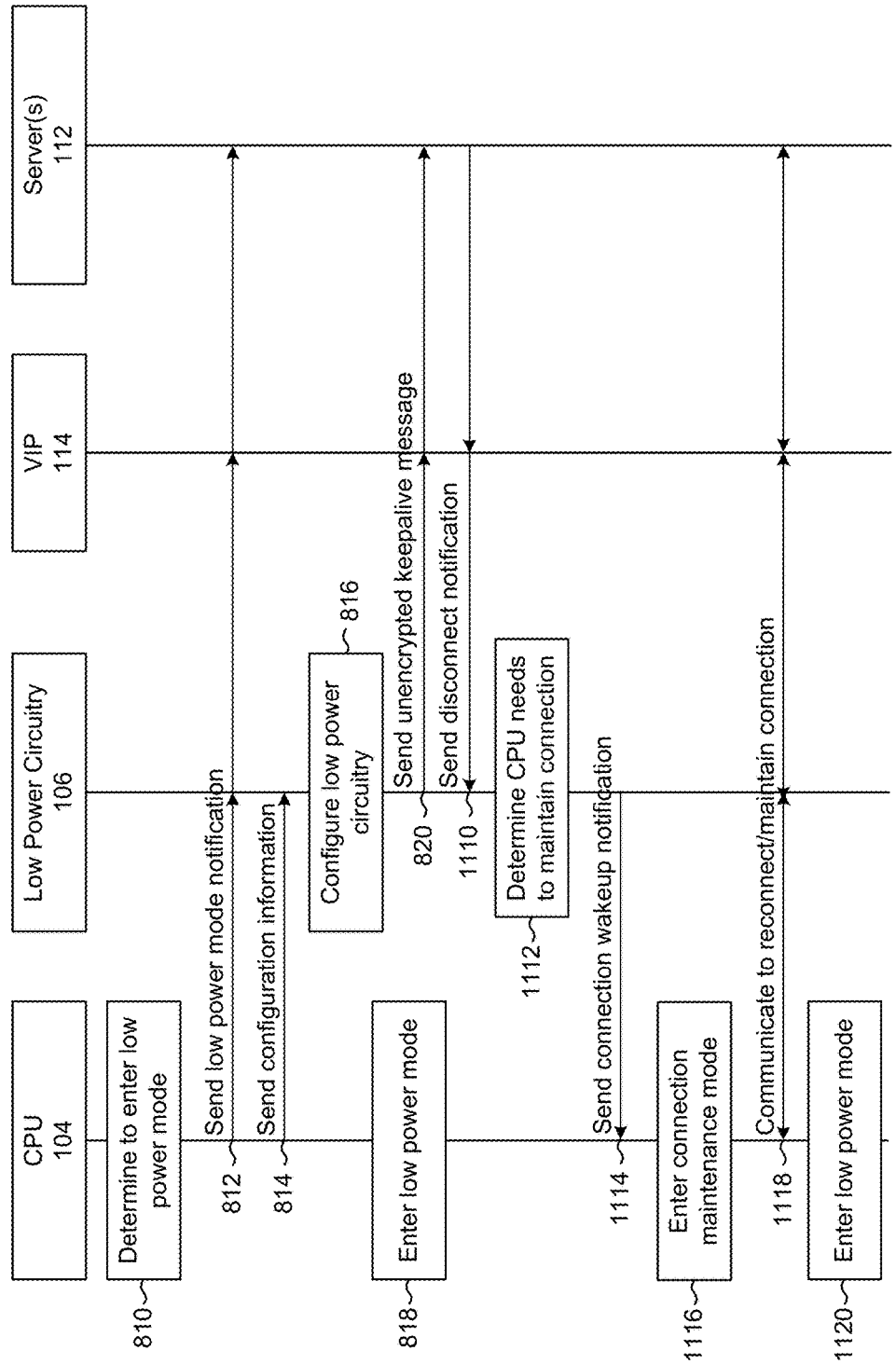
FIG. 11 is a communication diagram illustrating a communication event according to embodiments of the present disclosure.

FIG. 11 is a communication diagram illustrating a communication event according to embodiments of the present disclosure. As illustrated in FIG. 11, the CPU 104 may determine (810) to enter a low power mode, may send (812) a low power mode notification to the server(s) 112, and may send (814) configuration information to the low power circuitry 106, including an instruction to trigger a normal wakeup event when an incoming message matches a wakeup signature. The low power circuitry 106 may configure (816) the low power circuitry 106 and the CPU 104 may enter (818) the low power mode.

While the CPU 104 is in the low power mode, the low power circuitry 106 may send (820) unencrypted keepalive messages to the server(s) 112. The server(s) 112 may send (1110) a disconnect notification to the low power circuitry 106 and the low power circuitry 106 may determine (1112) that the CPU 104 needs to maintain the connection to the server(s) 112 and may send (1114) a connection wakeup notification to the CPU 104. The CPU 104 may enter (1116) a connection maintenance mode, communicate (1118) to reconnect/maintain connection to the server(s) 112 and may enter (1120) the low power mode.

Figure 12:
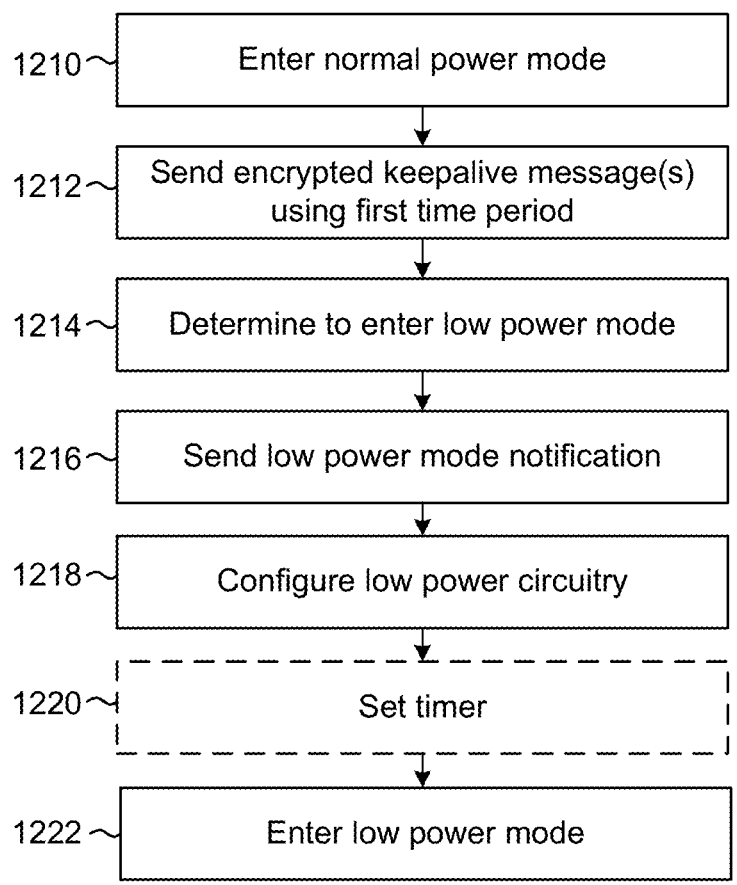
FIG. 12 is a flowchart conceptually illustrating an example method for entering a low power mode according to embodiments of the present disclosure.

FIG. 12 is a flowchart conceptually illustrating an example method for entering a low power mode according to embodiments of the present disclosure. As illustrated in FIG. 12, the CPU 104 may enter (1210) a normal power mode and may send (1212) encrypted keepalive message(s) using a first time period. At a later point in time, the CPU 104 may determine (1214) to enter a low power mode, may send (1216) a low power mode notification, may configure (1218) low power circuitry 106, may optionally set (1220) a timer and may enter (1222) the low power mode.

Figure 13A:
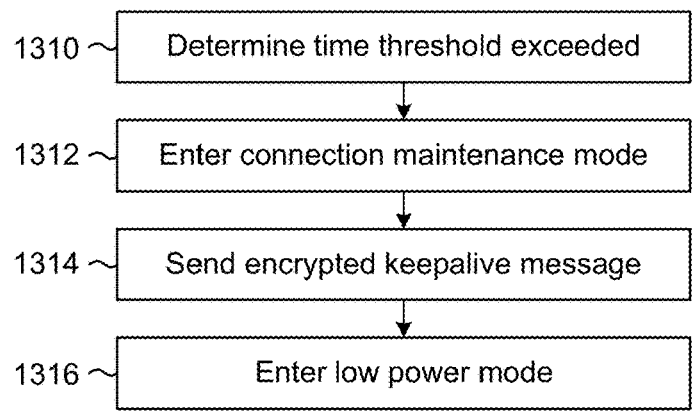
FIGS. 13A-13C are flowcharts conceptually illustrating example methods for responding to wakeup events according to embodiments of the present disclosure.
Figure 13B:
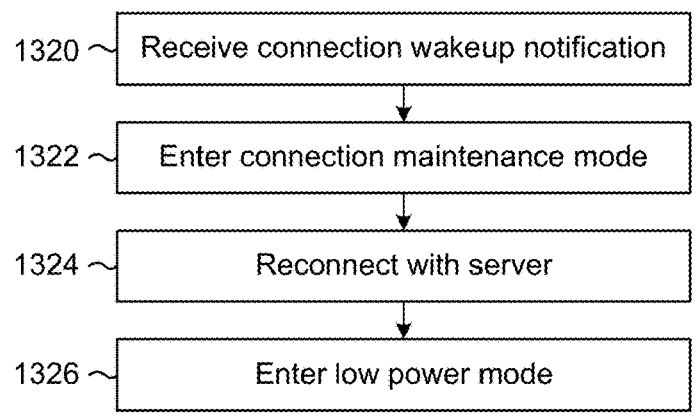
Figure 13C:
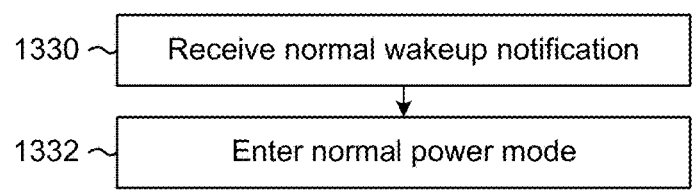

FIGS. 13A-13C are flowcharts conceptually illustrating example methods for responding to wakeup events according to embodiments of the present disclosure. As illustrated in FIG. 13A, the CPU 104 may determine (1310) that a time threshold is exceeded, may enter (1312) a connection maintenance mode, may send (1314) an encrypted keepalive message and may enter (1316) the low power mode again.

As illustrated in FIG. 13B, the CPU 104 may receive (1320) a connection wakeup notification, may enter (1322) the connection maintenance mode, may reconnect (1324) with the server and may enter (1326) the low power mode.

As illustrated in FIG. 13C, the CPU 104 may receive (1330) a normal wakeup notification and may enter (1332) a normal power mode.

Figure 14A:
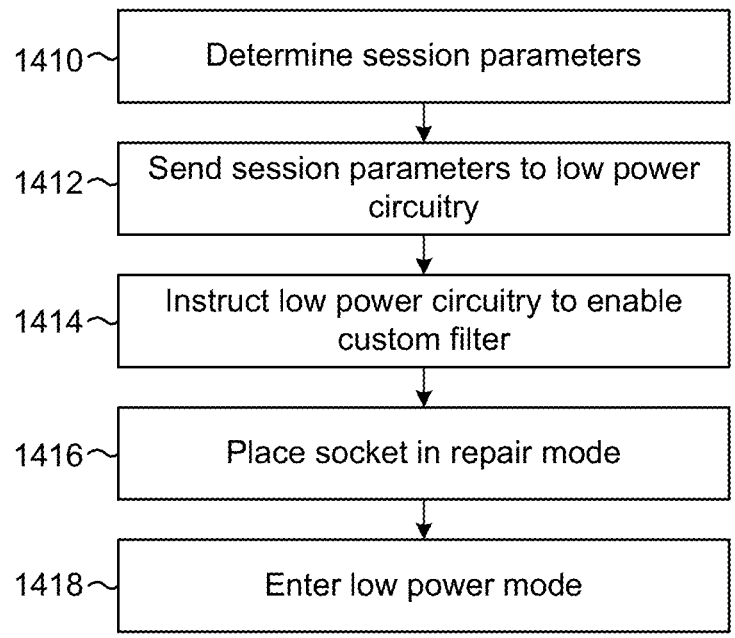
FIGS. 14A-14B are flowcharts conceptually illustrating example methods for transitioning between a processor and low power circuitry according to embodiments of the present disclosure.
Figure 14B:
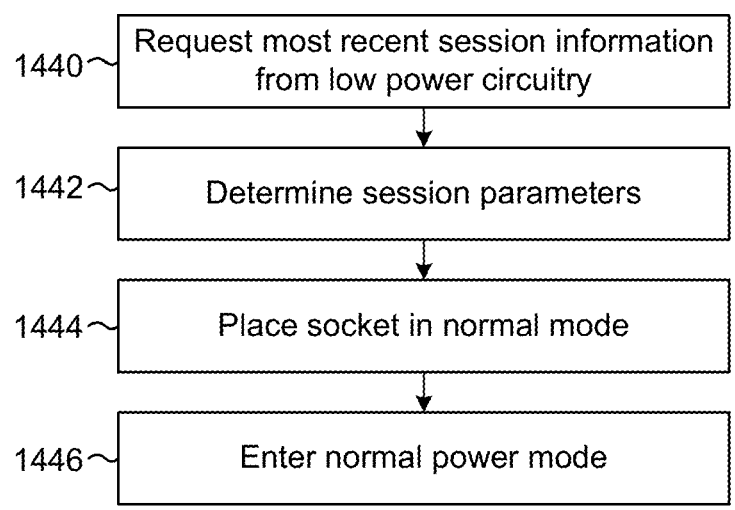

FIGS. 14A-14B are flowcharts conceptually illustrating example methods for transitioning between a processor and low power circuitry according to embodiments of the present disclosure. As illustrated in FIG. 14A, the CPU 104 may determine (1410) session parameters, may send (1412) the session parameters to low power circuitry 106, may instruct (1414) the low power circuitry to enable a custom filter (e.g., corresponding to the wakeup signature), may place (1416) a socket in repair mode and may enter (1418) a low power mode.

As illustrated in FIG. 14B, the CPU 104 may request (1440) most recent session information from the low power circuitry 106, may determine (1442) session parameters, may place (1444) the socket in normal mode and may enter (1446) normal power mode. For example, the CPU 104 may retrieve the session parameters and apply the session parameters prior to placing the socket in the normal mode.

FIG. 15 is a flowchart conceptually illustrating an example method for low power circuitry triggering wakeup events according to embodiments of the present disclosure. As illustrated in FIG. 15, the low power circuitry 106 may receive (1510) configuration information from the CPU 104 and may send (1512) unencrypted keepalive message(s)

using a first time period. The low power circuitry 106 may determine (1514) if a message was received, and if a message is not received, may determine (1516) if a time threshold was exceeded. If the time threshold was not exceeded, the low power circuitry 106 may loop (1518) to step 1512 and continue. If the time threshold was exceeded, the low power circuitry 106 may determine (1520) that acknowledgement message(s) were not received and may send (1522) a connection wakeup notification to the CPU 104.

If the low power circuitry 106 determined that a message was received in step 1514, the low power circuitry 106 may determine (1524) if the message matches a wakeup signature specified by the configuration information. If the message doesn't match the wakeup signature, the low power circuitry 106 may loop (1526) to step 1512 and continue. If the message matches the wakeup signature, the low power circuitry 106 may determine (1528) if the message is a disconnect notification. If the message is a disconnect notification, the low power circuitry 106 may loop (1530) to step 1522 and send a connection wakeup notification to the CPU 104. If the message is not a disconnect notification, the low power circuitry 106 may send (1532) a normal wakeup notification to the CPU 104.

While FIG. 15 illustrates the low power circuitry 106 performing step 1528 to determine whether to send a connection wakeup notification or a normal wakeup notification, the disclosure is not limited thereto. Instead, the low power circuitry 106 may send a normal wakeup notification when the message matches the wakeup signature and the CPU 104 may determine whether to enter the connection maintenance mode or the normal power mode. Additionally or alternatively, the low power circuitry 106 may send the normal wakeup notification instead of the connection wakeup notification and the CPU 104 may enter the normal power mode in response to every wakeup notification.

Figure 16:
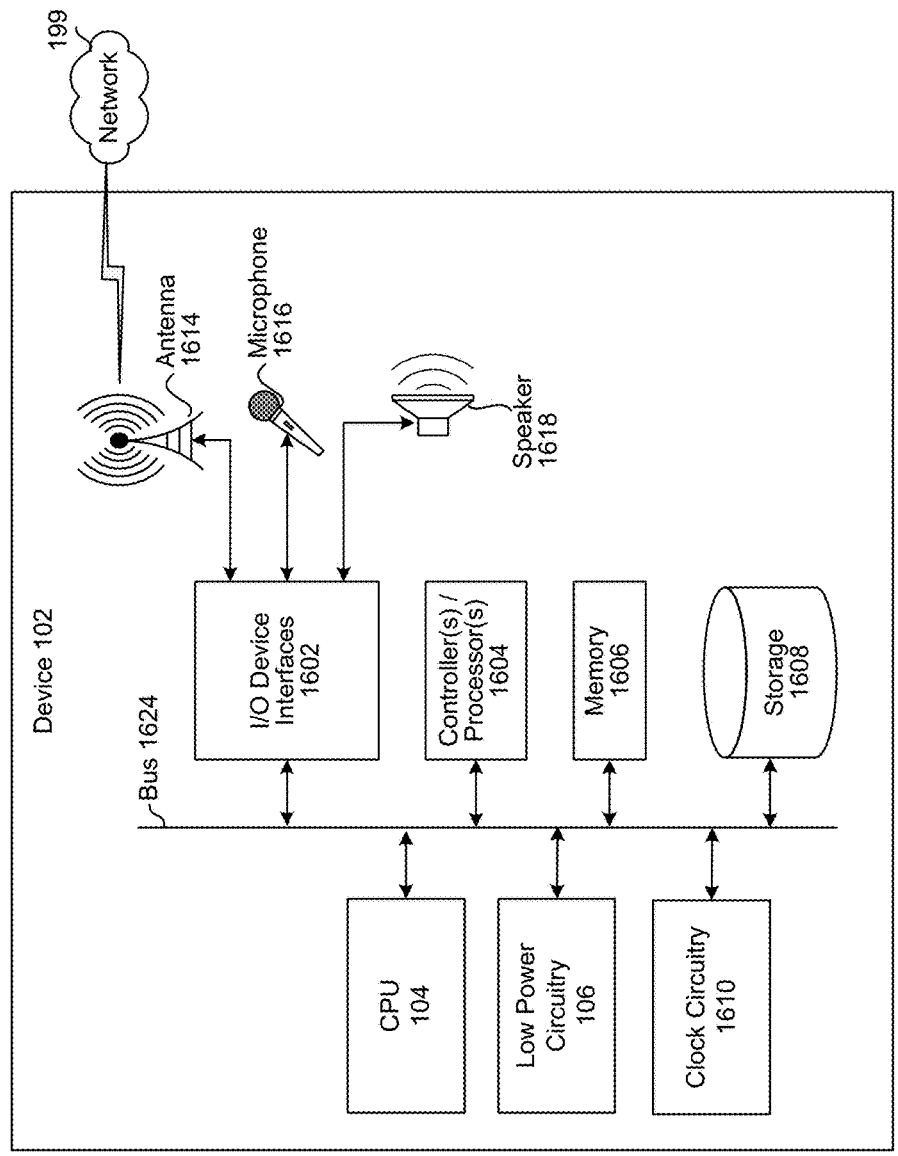
FIG. 16 is a block diagram conceptually illustrating example components of a device according to embodiments of the present disclosure.

FIG. 16 is a block diagram conceptually illustrating a device 102 that may be used with the described system. The device 102 may include one or more controllers/processors 1604, that may include a central processing unit (CPU) for processing data and computer-readable instructions, and a memory 1606 for storing data and instructions of the respective device. The memory 1606 may individually include volatile random access memory (RAM), non-volatile read only memory (ROM), non-volatile magnetoresistive (MRAM) and/or other types of memory. Each device may also include a data storage component 1608, for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 1602.

The device 102 may include the CPU 104, the low power circuitry 106 and, in some examples, clock circuitry 1610. Computer instructions for operating the device 102 and its various components may be executed by the respective device's controller(s)/processor(s) 1604/CPU 104/low power circuitry 106, using the memory 1606 as temporary "working" storage at runtime. A device's computer instructions may be stored in a non-transitory manner in non-volatile memory 1606, storage 1608, or an external device(s). Alternatively, some or all of the executable instructions may be embedded in hardware or firmware on the respective device in addition to or instead of software.

The device 102 includes input/output device interfaces 1602. A variety of components may be connected through the input/output device interfaces, as will be discussed further below. Additionally, the device 102 may include an address/data bus 1624 for conveying data among components of the respective device. Each component within the device 102 may also be directly connected to other components in addition to (or instead of) being connected to other components across the bus 1624.

As a way of indicating to a user that a connection between another device has been opened and/or a state of the device 102 (e.g., active, idle, low power mode or off), the device 102 may be configured with a visual indicator, such as an LED or similar component (not illustrated), that may change color, flash, or otherwise provide visual indications associated with the device 102. The device 102 may also include input/output device interfaces 1602 that connect to a variety of components such as an antenna 1614, a microphone 1616 and/or a speaker 1618. Via the antenna(s), the input/output device interfaces 1602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   sending, while in a first power mode, encrypted data to a remote device, the encrypted data corresponding to maintenance of a link between the first device and the remote device;
   determining, by a processor included in a first device, to enter a second power mode, the second power mode clock gating the processor and consuming less power than the first power mode;
   sending, by the processor via a wireless transceiver of the first device, first data to the remote device indicating that the processor is entering the second power mode and that the first device will send unencrypted data during the second power mode, the unencrypted data corresponding to maintenance of the link between the first device and the remote device;
   determining, by the processor, network parameters associated with the remote device, the network parameters including a first source address corresponding to the remote device and a first destination address corresponding to the first device;
   sending, by the processor, the network parameters to the wireless transceiver;
   sending, by the processor, an instruction to the wireless transceiver to trigger a wakeup event upon the wireless transceiver receiving, from the remote device, data that includes the network parameters;
   entering, by the processor, the second power mode;
   sending, while in the second power mode, the unencrypted data including a payload from the encrypted data;
   receiving, by the wireless transceiver, second data from the remote device, the second data including a second source address and a second destination address;
   determining that the second source address matches the first source address;
   determining that the second destination address matches the first destination address;
   generating, by the wireless transceiver, a first interrupt to the processor, the first interrupt instructing the processor to enter the first power mode; and
   entering, by the processor, the first power mode.

2. The computer-implemented method of claim 1, further comprising:
   entering, by the processor, the second power mode;
   receiving, by the wireless transceiver, third data from a second remote device, the third data including the second source address; and
   generating, by the wireless transceiver based at least in part on the third data, a second interrupt to the processor, the second interrupt instructing the processor to enter the first power mode.

3. The computer-implemented method of claim 1, further comprising:
   sending, while in the first power mode, by the processor via the wireless transceiver, the encrypted data to the remote device using a first time interval;
   sending, by the first processor via the wireless transceiver, the first data to the remote device, the first data indicating that the first device will send the encrypted data using a second time interval during the second power mode, the second time interval longer than the first time interval;
   determining, by the processor, a period of time associated with the second time interval;
   setting, using clock circuitry on the first device, a timer corresponding to the period of time;
   entering, by the processor, the second power mode;
   determining, by the clock circuitry, that the period of time has elapsed;
   entering, by the processor, a connection maintenance mode;
   sending, by the processor via the wireless transceiver, the encrypted data;
   resetting, using the clock circuitry, the timer; and
   entering, by the processor, the second power mode.

4. A computer-implemented method, comprising:
   sending, while in a first power mode, encrypted data to a remote device using a first time interval, the encrypted data corresponding to maintenance of a link between the first device and the remote device;
   determining, by a processor included in a first device, to enter a second power mode;
   sending, by the processor via a wireless transceiver of the first device, first data to the remote device indicating that the processor is entering the second power mode and that the first device will send the encrypted data using a second time interval during the second power mode;
   determining, by the processor, network parameters associated with the remote device;
   sending, by the processor, the network parameters to the wireless transceiver;
   sending, by the processor, an instruction to the wireless transceiver to trigger a wakeup event upon the wireless transceiver receiving, from the remote device, data that includes the network parameters;
   entering, by the processor, the second power mode, the second power mode consuming less power than the first power mode; and
   sending, while in the second power mode, the encrypted data to the remote device using the second time interval.

5. The computer-implemented method of claim 4, wherein the network parameters include:
   a first source address corresponding to the remote device;
   a first destination address corresponding to the first device;
   a first source port; and
   a first destination port.

6. The computer-implemented method of claim 5, further comprising:
   receiving, by the wireless transceiver, second data from the remote device, the second data including a second source address, a second destination address, a second source port and a second destination port;
   determining that the second source address matches the first source address;
   determining that the second destination address matches the first destination address;
   determining that the second port matches the first source port;
   determining that the second destination port matches the first destination port;
   generating, by the wireless transceiver, a first interrupt to the processor, the first interrupt instructing the processor to enter the first power mode; and
   entering, by the processor, the first power mode.

7. The computer-implemented method of claim 6, further comprising:

receiving, by the wireless transceiver, third data from a second remote device, the third data including the second source address; and generating, by the wireless transceiver based at least in part on the third data, a second interrupt to the processor, the second interrupt instructing the processor to enter the first power mode.

8. The computer-implemented method of claim 4, further comprising:

entering, by the processor, the second power mode;

determining, by the processor, a period of time associated with the second time interval;

setting, using clock circuitry on the first device, a timer corresponding to the period of time;

determining, by the clock circuitry, that the period of time has elapsed;

entering, by the processor, a connection maintenance mode;

sending, by the processor via the wireless transceiver, the encrypted data to the remote device;

resetting, using the clock circuitry, the timer; and entering, by the processor, the second power mode.

9. The computer-implemented method of claim 4, wherein the first data indicates that the first device will also send unencrypted data during the second power mode, the unencrypted data corresponding to maintenance of the link between the first device and the remote device, and the method further comprises:

sending, by the wireless transceiver, the unencrypted data to the remote device using the first time interval while in the second power mode, the unencrypted data including a payload from the encrypted data.

10. The computer-implemented method of claim 4, further comprising:

receiving, by the wireless transceiver, second data from the remote device, the second data indicating that the first device will be disconnected from the remote device;

generating, by the wireless transceiver, a first interrupt to the processor, the first interrupt instructing the processor to enter a connection maintenance mode;

entering, by the processor, the connection maintenance mode;

reconnecting, by the processor via the wireless transceiver, to the remote device; and entering, by the processor, the second power mode.

11. A first device, comprising:

at least one processor;

a wireless transceiver; and memory including first instructions operable to be executed by the at least one processor to cause the first device to:

send, while in a first power mode, encrypted data to a remote device, the encrypted data corresponding to maintenance of a link between the first device and the remote device;

determine, by the at least one processor, to enter a second power mode;

send, by the at least one processor via the wireless transceiver, first data to the remote device indicating that the processor is entering the second power mode and that the first device will send unencrypted data during the second power mode, the unencrypted data corresponding to maintenance of the link between the first device and the remote device;

determine, by the at least one processor, network parameters associated with the remote device;

send, by the at least one processor, the network parameters to the wireless transceiver;

send, by the at least one processor, an instruction to the wireless transceiver to trigger a wakeup event upon the wireless transceiver receiving, from the remote device, data that includes the network parameters;

enter, by the at least one processor, the second power mode; and send, while in the second power mode, unencrypted data to the remote device, the unencrypted data including a payload from the encrypted data.

12. The first device of claim 11, wherein the network parameters include:

a first source address corresponding to the remote device;

a first destination address corresponding to the first device;

a first source port; and a first destination port.

13. The first device of claim 12, wherein the memory further comprises second instructions operable to be executed by the wireless transceiver to cause the first device to:

receive, by the wireless transceiver, second data from the remote device, the second data including a second source address, a second destination address, a second source port and a second destination port;

determine, by the wireless transceiver, that the second source address matches the first source address;

determine, by the wireless transceiver, that the second destination address matches the first destination address;

determine, by the wireless transceiver, that the second port matches the first source port;

determine, by the wireless transceiver, that the second destination port matches the first destination port; and generate, by the wireless transceiver, a first interrupt to the at least one processor, the first interrupt instructing the at least one processor to enter the first power mode.

14. The first device of claim 13, wherein the second instructions, when executed by the wireless transceiver, further cause the first device to:

receive, by the wireless transceiver, third data from a second remote device, the third data including the second source address; and generate, by the wireless transceiver based at least in part on the third data, a second interrupt to the at least one processor, the second interrupt instructing the at least one processor to enter the first power mode.

15. The first device of claim 11, wherein the first instructions, when executed by the at least one processor, further cause the first device to:

send, while in the first power mode, by the at least one processor via the wireless transceiver, the encrypted data to the remote device using a first time interval; and send, while in the second power mode, by the at least one processor via the wireless transceiver, the encrypted data to the remote device using a second time interval.

16. The first device of claim 15, wherein the first instructions, when executed by the at least one processor, further cause the first device to:

determine, by the at least one processor, a period of time associated with the second time interval;

set, by the at least one processor using clock circuitry on the first device, a timer corresponding to the period of time;

determine, by the clock circuitry, that the period of time has elapsed;

enter, by the at least one processor, a connection maintenance mode;

send, by the at least one processor via the wireless transceiver, the encrypted data to the remote device;

reset, by the at least one processor using the clock circuitry, the timer; and enter, by the at least one processor, the second power mode.

17. The first device of claim 11, wherein the second instructions, when executed by the wireless transceiver, further cause the first device to:

receive, by the wireless transceiver, second data from the remote device, the second data indicating that the first device will be disconnected from the remote device;

generate, by the wireless transceiver, a first interrupt to the at least one processor, the first interrupt instructing the at least one processor to enter a connection maintenance mode, and the first instructions further configure the first device to:

enter, by the at least one processor, the connection maintenance mode;

reconnect, by the at least one processor via the wireless transceiver, to the remote device; and enter, by the at least one processor, the second power mode.

18. A computer-implemented method, comprising:

determining, by a processor included in a first device, to enter a first power mode;

sending, by the processor via a wireless transceiver of the first device, first data to a remote device indicating that the processor is entering the first power mode;

determining, by the processor, network parameters associated with the remote device;

sending, by the processor, the network parameters to the wireless transceiver;

sending, by the processor, an instruction to the wireless transceiver to trigger a wakeup event upon the wireless transceiver receiving, from the remote device, data that includes the network parameters;

entering, by the processor, the first power mode;

receiving, by the wireless transceiver, second data from the remote device, the second data indicating that the first device will be disconnected from the remote device;

generating, by the wireless transceiver, a first interrupt to the processor, the first interrupt instructing the processor to enter a second power mode corresponding to connection maintenance;

entering, by the processor, the second power mode;

reconnecting, by the processor via the wireless transceiver, to the remote device; and entering, by the processor, the first power mode.

* * * * *